US010383476B2

United States Patent
Alexander et al.

(10) Patent No.: US 10,383,476 B2
(45) Date of Patent: Aug. 20, 2019

(54) HEATED OR COOLED DRINKWARE

(71) Applicant: Ember Technologies, Inc., Westlake Village, CA (US)

(72) Inventors: Clayton Alexander, Westlake Village, CA (US); Christopher Thomas Wakeham, Solana Beach, CA (US); Daren John Leith, Agoura Hills, CA (US); Mikko Juhani Timperi, San Marcos, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 148 days.

(21) Appl. No.: 15/705,117

(22) Filed: Sep. 14, 2017

(65) Prior Publication Data

US 2018/0084943 A1     Mar. 29, 2018

Related U.S. Application Data

(60) Provisional application No. 62/401,709, filed on Sep. 29, 2016.

(51) Int. Cl.
*A47J 36/24* (2006.01)
*A47G 19/22* (2006.01)
(Continued)

(52) U.S. Cl.
CPC ...... *A47J 36/2472* (2013.01); *A47G 19/2205* (2013.01); *A47G 19/2288* (2013.01);
(Continued)

(58) Field of Classification Search
CPC ............. A47G 19/2288; A47G 19/2205; A47J 41/0044; A47J 36/2416; A47J 36/2494;
(Continued)

(56) References Cited

U.S. PATENT DOCUMENTS

| 1,649,067 A | 11/1927 | Karlson |
| 1,721,311 A | 7/1929 | Muenchen |

(Continued)

FOREIGN PATENT DOCUMENTS

| CH | 631614 | 8/1982 |
| CN | 1338240 A | 3/2002 |

(Continued)

OTHER PUBLICATIONS

Decision of Rejection dated Apr. 4, 2017 in JP Application No. 2013-537797.

(Continued)

*Primary Examiner* — Gail Kaplan Verbitsky
(74) *Attorney, Agent, or Firm* — Knobbe, Martens, Olson & Bear LLP

(57) ABSTRACT

An actively heated or cooled beverage container includes a body chosen from a group consisting of a mug, a cup and a travel mug, the body having a chamber configured to receive and hold a food or beverage therein. The container has a temperature control system that includes a phase change material positioned about at least a portion of the chamber that removes heat from the beverage disposed in the chamber that has a temperature above a predetermined drinking temperature to lower the temperature of the beverage toward the predetermined drinking temperature. One or more heating elements positioned in thermal communication with a different portion of the chamber than the phase change material. The temperature control system also has control circuitry configured to control the operation of the heating element. The temperature control system also includes a ring rotatably coupled to a distal end of the body, the ring configured to rotate about a central axis of the container relative to a proximal portion of the body and to communicate with the control circuitry.

15 Claims, 20 Drawing Sheets

(51) Int. Cl.
  *A47J 31/44* (2006.01)
  *A47J 41/00* (2006.01)
  *B65D 43/02* (2006.01)
  *B65D 53/02* (2006.01)

(52) U.S. Cl.
  CPC ......... *A47J 31/441* (2013.01); *A47J 36/2444* (2013.01); *A47J 36/2466* (2013.01); *A47J 36/2494* (2013.01); *A47J 41/0044* (2013.01); *A47J 41/0094* (2013.01); *B65D 43/0202* (2013.01); *B65D 53/02* (2013.01)

(58) Field of Classification Search
  CPC ................ A47J 36/2466; A47J 41/0094; A47J 27/21041; A47J 36/2444; A47J 41/00; A01K 41/023
  See application file for complete search history.

(56) References Cited

U.S. PATENT DOCUMENTS

| | | |
|---|---|---|
| 2,046,125 A | 6/1936 | Lacy |
| 3,064,113 A | 11/1962 | Mani |
| 3,155,260 A | 11/1964 | Widener |
| 3,345,934 A | 10/1967 | Steiner |
| 3,463,140 A | 8/1969 | Rollor |
| 3,603,106 A | 9/1971 | Ryan |
| 3,622,753 A | 11/1971 | Lax |
| 3,676,248 A | 7/1972 | Swartz |
| 3,678,248 A | 7/1972 | Tricault |
| 3,739,148 A | 6/1973 | Ryckman, Jr. |
| 3,766,975 A | 10/1973 | Todd |
| 3,797,563 A | 3/1974 | Hoffmann et al. |
| 3,892,945 A | 7/1975 | Lerner |
| 3,931,494 A | 1/1976 | Fisher |
| 4,068,115 A | 1/1978 | MacK et al. |
| 4,095,090 A | 6/1978 | Pianezza |
| 4,134,004 A | 1/1979 | Anderson et al. |
| 4,240,272 A | 12/1980 | Pierzchala et al. |
| 4,442,343 A | 4/1984 | Genuit et al. |
| 4,470,999 A | 9/1984 | Carpiac |
| 4,531,046 A | 7/1985 | Stover |
| 4,537,044 A | 8/1985 | Putnam |
| D296,509 S | 7/1988 | Fuke |
| 4,801,782 A | 1/1989 | Ineson |
| 4,827,107 A | 5/1989 | Peery |
| 4,936,377 A * | 6/1990 | DeVogel ............... A47J 39/006 165/47 |
| 4,978,833 A | 12/1990 | Knepler |
| 4,980,539 A | 12/1990 | Walton |
| 4,982,722 A | 1/1991 | Wyatt |
| 4,983,798 A | 1/1991 | Eckler |
| 5,042,258 A | 8/1991 | Sundhar |
| 5,090,209 A | 2/1992 | Martin |
| 5,163,290 A | 11/1992 | Kinnear |
| 5,199,275 A | 4/1993 | Martin |
| 5,208,896 A | 5/1993 | Katayev |
| 5,217,064 A | 6/1993 | Kellow |
| 5,243,684 A | 9/1993 | Edwards |
| 5,274,215 A | 12/1993 | Jackson |
| 5,283,420 A | 2/1994 | Montalto |
| 5,313,787 A | 5/1994 | Martin |
| 5,343,368 A | 8/1994 | Miller |
| 5,388,565 A | 2/1995 | Ou |
| 5,448,809 A | 9/1995 | Kraus |
| 5,497,883 A | 3/1996 | Monetti |
| 5,508,494 A | 4/1996 | Sarris |
| 5,549,035 A | 8/1996 | Wing-Chung |
| 5,550,452 A | 8/1996 | Shirai |
| 5,603,220 A | 2/1997 | Seaman |
| 5,603,858 A | 2/1997 | Wyatt |
| 5,643,485 A | 7/1997 | Potter |
| 5,678,925 A | 10/1997 | Garmaise |
| 5,731,568 A | 3/1998 | Malecek |
| 5,737,923 A | 4/1998 | Gilley |
| 5,786,643 A | 7/1998 | Wyatt |
| 5,842,353 A | 12/1998 | Kuo-Liang |
| 5,884,006 A | 3/1999 | Frohlich |
| 5,903,133 A | 5/1999 | Amero, Jr. |
| 5,948,301 A | 9/1999 | Liebermann |
| 5,954,984 A | 9/1999 | Ablah |
| 5,959,433 A | 9/1999 | Rohde |
| 6,005,233 A | 12/1999 | Wyatt |
| 6,013,901 A | 1/2000 | Lavoie |
| 6,020,575 A | 2/2000 | Nagle et al. |
| 6,032,481 A | 3/2000 | Mosby |
| 6,042,720 A | 3/2000 | Reber |
| 6,072,161 A | 6/2000 | Stein |
| 6,075,229 A | 6/2000 | Vanselow |
| 6,089,409 A | 7/2000 | Hart |
| 6,108,489 A | 8/2000 | Frohlich et al. |
| 6,110,159 A | 8/2000 | Tsujita |
| 6,123,065 A | 9/2000 | Teglbjarg |
| 6,140,614 A * | 10/2000 | Padamsee ........... A47J 36/2466 219/438 |
| 6,144,016 A | 11/2000 | Garvin |
| 6,158,227 A | 12/2000 | Seeley |
| 6,180,003 B1 | 1/2001 | Reber et al. |
| 6,212,959 B1 | 4/2001 | Perkins |
| 6,232,585 B1 | 5/2001 | Clothier |
| RE37,213 E | 6/2001 | Staggs |
| 6,274,856 B1 | 8/2001 | Clothier |
| 6,279,470 B2 | 8/2001 | Simeray |
| 6,281,611 B1 | 8/2001 | Chen et al. |
| 6,310,329 B1 | 10/2001 | Carter |
| 6,314,867 B1 | 11/2001 | Russell |
| 6,316,753 B2 | 11/2001 | Clothier |
| 6,320,169 B1 | 11/2001 | Clothier |
| 6,350,972 B1 | 2/2002 | Wright |
| 6,353,208 B1 | 3/2002 | Bostic |
| 6,376,803 B1 | 4/2002 | Klinger |
| 6,384,387 B1 | 5/2002 | Owens |
| 6,403,928 B1 | 6/2002 | Ford |
| 6,414,278 B1 | 7/2002 | Frohlich et al. |
| 6,415,624 B1 | 7/2002 | Connors |
| 6,427,863 B1 | 8/2002 | Nichols |
| 6,433,313 B1 | 8/2002 | Owens |
| 6,444,961 B2 | 9/2002 | Clothier |
| 6,543,335 B1 | 4/2003 | Lassota |
| 6,555,789 B2 | 4/2003 | Owens |
| 6,571,564 B2 | 6/2003 | Upadhye et al. |
| 6,584,374 B2 | 6/2003 | Lee et al. |
| 6,634,417 B1 | 10/2003 | Kolowich |
| 6,657,170 B2 | 12/2003 | Clothier |
| 6,662,978 B2 | 12/2003 | Lin et al. |
| 6,664,520 B2 | 12/2003 | Clothier |
| 6,674,052 B1 | 1/2004 | Luo |
| 6,702,138 B1 | 3/2004 | Bielecki et al. |
| 6,703,590 B1 | 3/2004 | Holley, Jr. |
| 6,818,867 B2 | 11/2004 | Kressmann |
| 6,852,954 B1 | 2/2005 | Liu et al. |
| 6,864,462 B2 | 3/2005 | Sanoner et al. |
| 6,870,135 B2 | 3/2005 | Hamm et al. |
| 6,953,913 B1 | 10/2005 | Hara et al. |
| 6,968,888 B2 | 11/2005 | Kolowich |
| 7,002,111 B2 | 2/2006 | Bauer |
| 7,022,946 B2 * | 4/2006 | Sanoner ............. A47G 19/2227 219/387 |
| 7,034,256 B1 | 4/2006 | Phillips |
| 7,059,387 B2 | 6/2006 | Kolowich |
| 7,073,678 B1 | 7/2006 | Dibdin |
| 7,091,455 B2 | 8/2006 | Fung |
| 7,109,445 B2 | 9/2006 | Patterson et al. |
| 7,193,190 B2 | 3/2007 | Kissel, Jr. |
| 7,208,707 B2 | 4/2007 | Clothier |
| 7,212,955 B2 | 5/2007 | Kirshenbaum et al. |
| 7,227,108 B2 | 6/2007 | Clothier |
| 7,263,283 B2 | 8/2007 | Knepler |
| 7,276,676 B1 | 10/2007 | Thompson |
| 7,287,386 B2 | 10/2007 | Upadhye |
| 7,414,380 B2 | 8/2008 | Tang |
| 7,419,073 B2 | 9/2008 | Crisp, III |
| 7,431,174 B2 | 10/2008 | Thissen |
| 7,571,830 B2 | 8/2009 | Lin |

(56) References Cited

U.S. PATENT DOCUMENTS

| | | | |
|---|---|---|---|
| 7,592,084 B2 | 9/2009 | Hoffjann | |
| 7,659,493 B2 | 2/2010 | Reusche | |
| 7,681,754 B1 | 3/2010 | Ross | |
| 7,683,572 B2 | 3/2010 | Toya | |
| 7,810,348 B2* | 10/2010 | Shewchuk | F25D 3/08 62/457.1 |
| 7,815,067 B2 | 10/2010 | Matsumoto et al. | |
| 7,825,353 B2 | 11/2010 | Shingler | |
| 7,836,722 B2 | 11/2010 | Magill et al. | |
| 7,934,537 B2 | 5/2011 | Kolowich | |
| 7,942,145 B2 | 5/2011 | Palena et al. | |
| 7,948,209 B2 | 5/2011 | Jung | |
| 7,966,927 B2 | 6/2011 | Yoakim | |
| 7,997,786 B2 | 8/2011 | Liu | |
| 8,055,310 B2 | 11/2011 | Beart et al. | |
| 8,061,149 B1 | 11/2011 | Gowans | |
| 8,076,620 B2 | 12/2011 | Maupin | |
| 8,146,485 B2 | 4/2012 | Ozanne | |
| 8,205,468 B2 | 6/2012 | Hemminger et al. | |
| 8,272,532 B2 | 9/2012 | Michaelian et al. | |
| 8,274,016 B2 | 9/2012 | Montana | |
| 8,280,453 B2 | 10/2012 | Beart et al. | |
| 8,319,154 B2 | 11/2012 | Shaikh et al. | |
| 8,336,729 B2 | 12/2012 | Kelly | |
| 8,400,104 B2 | 3/2013 | Adamczyk | |
| 8,448,809 B2 | 5/2013 | Kelly | |
| 8,467,669 B2 | 6/2013 | Widanagamage et al. | |
| 8,479,941 B2 | 7/2013 | Matsumoto et al. | |
| 8,618,448 B2 | 12/2013 | Alexander | |
| 8,621,980 B2 | 1/2014 | Bunn | |
| 8,759,721 B1 | 6/2014 | Alexander | |
| 8,907,796 B2 | 12/2014 | Sweeney et al. | |
| 9,035,222 B2 | 5/2015 | Alexander | |
| 9,151,545 B2 | 10/2015 | Soukhojak | |
| 9,184,427 B2 | 11/2015 | Chuang | |
| 9,351,600 B2 | 5/2016 | Rime | |
| 9,480,363 B2 | 11/2016 | Delattre | |
| 9,606,522 B2* | 3/2017 | Hoffman | G05B 19/042 |
| 9,667,584 B2* | 5/2017 | Archibong | H04L 65/4084 |
| 10,010,213 B2* | 7/2018 | Alexander | A47J 36/2472 |
| 2001/0009609 A1 | 7/2001 | Bradenbaugh | |
| 2001/0022304 A1 | 9/2001 | Roche | |
| 2001/0023866 A1 | 9/2001 | Wang | |
| 2002/0023912 A1 | 2/2002 | McGee | |
| 2002/0083840 A1 | 7/2002 | Lassota | |
| 2002/0001297 A1 | 9/2002 | Westbrook | |
| 2002/0129712 A1 | 9/2002 | Westbrook | |
| 2002/0162339 A1 | 11/2002 | Harrison | |
| 2002/0175158 A1 | 11/2002 | Sanoner et al. | |
| 2003/0024250 A1 | 2/2003 | Haas | |
| 2003/0029662 A1 | 2/2003 | Piech | |
| 2003/0029862 A1 | 2/2003 | Clothier | |
| 2003/0066638 A1 | 4/2003 | Qu | |
| 2003/0145621 A1 | 8/2003 | Kidwell | |
| 2004/0004072 A1 | 1/2004 | Clothier | |
| 2004/0159240 A1 | 8/2004 | Lyall | |
| 2004/0167592 A1 | 8/2004 | Grove | |
| 2004/0194470 A1 | 10/2004 | Upadhye et al. | |
| 2005/0045615 A1 | 3/2005 | Sanoner et al. | |
| 2005/0045618 A1 | 3/2005 | Sanoner et al. | |
| 2005/0121431 A1 | 6/2005 | Yuen | |
| 2005/0242804 A1 | 11/2005 | Hintz | |
| 2006/0023480 A1 | 2/2006 | Plummer | |
| 2006/0081599 A1 | 4/2006 | Anderson | |
| 2006/0173259 A1 | 8/2006 | Flaherty | |
| 2006/0207442 A1 | 9/2006 | Pettersson | |
| 2006/0209628 A1 | 9/2006 | Jones | |
| 2006/0261233 A1 | 11/2006 | Williams et al. | |
| 2007/0024237 A1 | 2/2007 | Cole et al. | |
| 2007/0092773 A1 | 4/2007 | Guo | |
| 2007/0151457 A1 | 7/2007 | Rabin et al. | |
| 2007/0182367 A1 | 8/2007 | Partovi | |
| 2007/0223895 A1 | 9/2007 | Flemm | |
| 2007/0278207 A1 | 12/2007 | Van Hoy | |
| 2007/0279002 A1 | 12/2007 | Partovi | |
| 2008/0011077 A1 | 1/2008 | Ramus et al. | |
| 2008/0019122 A1 | 1/2008 | Kramer | |
| 2008/0022695 A1 | 1/2008 | Welle | |
| 2008/0022696 A1 | 1/2008 | Welle | |
| 2008/0041233 A1 | 2/2008 | Bunn | |
| 2008/0041859 A1 | 2/2008 | Teglbjarg | |
| 2008/0087270 A1 | 4/2008 | Shaikh | |
| 2008/0121630 A1 | 5/2008 | Simard | |
| 2008/0135564 A1 | 6/2008 | Romero | |
| 2008/0141681 A1 | 6/2008 | Arnold | |
| 2008/0149624 A1 | 6/2008 | Tamura | |
| 2008/0179311 A1 | 7/2008 | Koro et al. | |
| 2008/0190914 A1 | 8/2008 | Gibson | |
| 2008/0213449 A1 | 9/2008 | Wisner et al. | |
| 2008/0230508 A1* | 9/2008 | Overgaard | A45F 3/16 215/386 |
| 2008/0251063 A1 | 10/2008 | Palena et al. | |
| 2008/0272134 A1 | 11/2008 | Rohe | |
| 2009/0071952 A1 | 3/2009 | Kuwabara | |
| 2009/0102296 A1 | 4/2009 | Greene et al. | |
| 2009/0157153 A1* | 6/2009 | Lemke | A61F 7/10 607/114 |
| 2009/0166350 A1 | 7/2009 | Ho | |
| 2009/0184102 A1 | 7/2009 | Parker, Jr. et al. | |
| 2009/0230117 A1 | 9/2009 | Fernando | |
| 2010/0000980 A1 | 1/2010 | Popescu | |
| 2010/0028758 A1 | 2/2010 | Eaves | |
| 2010/0108694 A1 | 5/2010 | Sedlbauer et al. | |
| 2010/0125417 A1 | 5/2010 | Hyde et al. | |
| 2010/0158489 A1 | 6/2010 | Siu et al. | |
| 2010/0186499 A1 | 7/2010 | Ramus et al. | |
| 2010/0251755 A1 | 10/2010 | Lauchnor | |
| 2011/0056215 A1 | 3/2011 | Ham et al. | |
| 2011/0062149 A1 | 3/2011 | Oriel et al. | |
| 2011/0070474 A1 | 3/2011 | Lee et al. | |
| 2011/0072978 A1 | 3/2011 | Popescu | |
| 2011/0108506 A1 | 5/2011 | Lindhorst-Ko | |
| 2011/0121660 A1 | 5/2011 | Azancot et al. | |
| 2011/0152979 A1 | 6/2011 | Driscoll et al. | |
| 2011/0155621 A1 | 6/2011 | Lindquist et al. | |
| 2011/0174993 A1 | 7/2011 | Blain | |
| 2011/0180527 A1 | 7/2011 | Abbott | |
| 2011/0198255 A1 | 8/2011 | Baumfalk et al. | |
| 2011/0259871 A1 | 10/2011 | Li | |
| 2011/0265562 A1 | 11/2011 | Li | |
| 2012/0061050 A1 | 3/2012 | Petrillo et al. | |
| 2012/0064470 A1 | 3/2012 | Delattre et al. | |
| 2012/0082766 A1 | 4/2012 | Maupin et al. | |
| 2012/0090333 A1 | 4/2012 | DellaMorte et al. | |
| 2012/0103562 A1 | 5/2012 | Alexander | |
| 2012/0118874 A1 | 5/2012 | Williams et al. | |
| 2012/0132646 A1 | 5/2012 | England et al. | |
| 2012/0138597 A1 | 6/2012 | Quella et al. | |
| 2012/0193999 A1 | 8/2012 | Zeine | |
| 2012/0235505 A1 | 9/2012 | Schatz et al. | |
| 2012/0235636 A1 | 9/2012 | Partovi | |
| 2012/0248095 A1 | 10/2012 | Lee et al. | |
| 2012/0248096 A1 | 10/2012 | Lee et al. | |
| 2012/0255946 A1 | 10/2012 | Kim et al. | |
| 2012/0256585 A1 | 10/2012 | Partovi et al. | |
| 2012/0258229 A1 | 10/2012 | Mindrup | |
| 2012/0312031 A1 | 12/2012 | Olsen | |
| 2012/0319500 A1 | 12/2012 | Beart et al. | |
| 2013/0059259 A1 | 3/2013 | Oldani | |
| 2013/0103463 A1 | 4/2013 | Briar et al. | |
| 2013/0167730 A1 | 7/2013 | Behm | |
| 2013/0200064 A1 | 8/2013 | Alexander | |
| 2013/0206015 A1 | 8/2013 | Jacoby | |
| 2013/0221013 A1 | 8/2013 | Kolowich et al. | |
| 2013/0239607 A1 | 9/2013 | Kelly | |
| 2013/0255824 A1 | 10/2013 | Williams et al. | |
| 2013/0275075 A1 | 10/2013 | Johnson | |
| 2013/0287967 A1 | 10/2013 | Ono | |
| 2013/0292044 A1* | 11/2013 | Wenzel | A61K 8/0208 156/226 |
| 2014/0165607 A1 | 6/2014 | Alexander | |
| 2014/0230484 A1 | 8/2014 | Yavitz | |
| 2014/0238985 A1 | 8/2014 | Sweeney et al. | |
| 2014/0305927 A1 | 10/2014 | Alexander | |

(56) References Cited

U.S. PATENT DOCUMENTS

| | | |
|---|---|---|
| 2015/0024349 A1 | 1/2015 | Bischoff |
| 2015/0122688 A1 | 5/2015 | Dias |
| 2015/0245723 A1 | 9/2015 | Alexander |
| 2015/0250346 A1* | 9/2015 | Baston .................. A47J 31/005 99/316 |
| 2015/0335184 A1 | 11/2015 | Balachandran |
| 2016/0183730 A1 | 6/2016 | Bedi |
| 2016/0332799 A1* | 11/2016 | Kolowich ........... A47J 36/2444 |
| 2016/0346116 A1* | 12/2016 | Ohmer ...................... A61F 7/08 |
| 2017/0150840 A1 | 6/2017 | Park |
| 2018/0084943 A1* | 3/2018 | Alexander .......... A47J 36/2466 |
| 2018/0216833 A1* | 8/2018 | Baker .................. A01K 41/023 |

FOREIGN PATENT DOCUMENTS

| | | |
|---|---|---|
| CN | 1502513 A | 6/2004 |
| CN | 2708795 Y | 7/2005 |
| CN | 1748112 A | 3/2006 |
| CN | 1776992 A | 5/2006 |
| CN | 2922666 Y | 7/2007 |
| CN | 101069606 A | 11/2007 |
| CN | 101109795 A | 1/2008 |
| CN | 201042350 Y | 4/2008 |
| CN | 201076180 | 6/2008 |
| CN | 201308643 | 10/2008 |
| CN | 201237271 | 5/2009 |
| CN | 101507261 A | 8/2009 |
| CN | 201303850 Y | 9/2009 |
| CN | 201445353 U | 5/2010 |
| CN | 101820128 A | 9/2010 |
| CN | 201612420 U | 10/2010 |
| CN | 102 164 526 A | 8/2011 |
| CN | 102802294 | 5/2012 |
| CN | 202681700 | 1/2013 |
| CN | 202919767 U | 5/2013 |
| CN | 102266184 B | 10/2013 |
| CN | 203468187 U | 3/2014 |
| CN | 204743683 U * | 11/2015 |
| DE | 19744526 | 4/1999 |
| DE | 20108363 | 8/2001 |
| DE | 20314416 | 1/2004 |
| EP | 0332355 | 9/1989 |
| EP | 0722708 | 7/1996 |
| EP | 0895772 | 2/1999 |
| EP | 2165243 A1 | 3/2010 |
| EP | 2001761 | 1/2012 |
| EP | 2308771 | 6/2012 |
| FR | 2737380 | 1/1997 |
| FR | 2752377 | 2/1998 |
| FR | 2763463 | 11/1998 |
| FR | 2828082 | 2/2003 |
| GB | 1 311 955 A | 3/1973 |
| GB | 2 390 798 A | 1/2004 |
| GB | 2414922 A | 12/2005 |
| GB | 2441825 | 3/2008 |
| JP | U-S54-14 7575 | 4/1953 |
| JP | S63-249519 A | 10/1988 |
| JP | H05-306472 A | 11/1993 |
| JP | 06-021549 U | 3/1994 |
| JP | H10-146276 U | 6/1998 |
| JP | 11-268777 | 10/1999 |
| JP | 2000-279302 A | 10/2000 |
| JP | 2003-299255 A | 10/2003 |
| JP | A-2004-261493 | 9/2004 |
| JP | 2006-345957 | 6/2005 |
| JP | 2005-181313 | 7/2005 |
| JP | 2005-308353 A | 11/2005 |
| JP | 2006-068152 | 3/2006 |
| JP | 2006-102234 A | 4/2006 |
| JP | 2006-166522 A | 6/2006 |
| JP | 2007-064557 A | 3/2007 |
| JP | 2007-312932 | 12/2007 |
| JP | 2007-312932 A | 12/2007 |
| JP | 2008-173464 A | 7/2008 |
| JP | U-3153007 | 7/2009 |
| JP | 2010-527226 A | 8/2010 |
| JP | 2011-171205 | 9/2011 |
| JP | 2012-523085 A | 9/2012 |
| JP | 5127819 | 1/2013 |
| JP | 2013-540551 | 11/2013 |
| JP | 5481388 | 4/2014 |
| KR | 10-1998-0073696 | 11/1998 |
| WO | WO 2004/055654 A2 | 7/2004 |
| WO | WO 2008/028329 | 3/2008 |
| WO | WO 2008/065175 | 6/2008 |
| WO | WO 2008/137996 A1 | 11/2008 |
| WO | WO 2008/155538 A2 | 12/2008 |
| WO | WO 2009/138930 A1 | 11/2009 |
| WO | WO 2011/131595 A2 | 10/2011 |
| WO | WO 2012/104665 | 8/2012 |

OTHER PUBLICATIONS

European Office Action dated Sep. 28, 2017, received in European Patent Application No. 14 774 350.4, pp. 5.

European Patent Office Search Report dated Mar. 17, 2016 regarding Application No. 11838764.6-1804, PCT/US2011059014, 7 pages.

First Office Action dated Nov. 23, 2016 in CN Application No. 201480014620.9.

International Preliminary Report on Patentability dated May 7, 2013 in PCT Application No. PCT/US2011/059014.

International Search Report and Written Opinion dated Jul. 2015, Application No. PCT/US15/36304, 18 pages.

International Search Report and Written Opinion dated Jan. 12, 2016 in PCT Application No. PCT/US15/36304.

International Search Report and Written Opinion dated Dec. 9, 2014 in PCT/US2014/019130.

International Search Report and Written Opinion dated Jul. 12, 2017, in PCT Application No. PCT/US2017/031534.

International Search Report and Written Opinion dated Mar. 16, 2012 in PCT/US2011 /059014.

Non-final Office Action dated Nov. 14, 2016 in U.S. Appl. No. 15/050,714.

Non-final office action dated Aug. 2, 2016 in Japanese Patent Application No. 2013-537797.

Notice of Reason(s) for Rejection dated Aug. 11, 2015 in JP Application No. 2013-53797.

Office Action in related Chinese Application No. 201180063844.5, dated Dec. 29, 2014.

Patent Examination Report No. 1 in related Australian Application No. 2011323416, dated May 15, 2015.

Patent Examination Report No. 2 in related Australian Application No. 2011323416, dated Oct. 20, 2015.

PCT International Search Report and Written Opinion dated Sep. 14, 2017 regarding International Application No. PCT/US2017/034081, 15 pages.

Second Office Action dated Apr. 10, 2017 in CN Application No. 201510869257.5.

Supplementary European Search Report dated Oct. 18, 2016 in European Patent Application No. 14774350.4.

Office Action dated Sep. 4, 2018 regarding Japan Patent Application No. 2017-554610, 10 pages.

Office Action dated Aug. 7, 2018, received for Japanese Patent Application No. JP 2017-151497, 4 pages.

Office Action received in Japanese Patent Application No. 2017-151497, dated Nov. 21, 2017, 5 pages.

European Search Report received in European Patent Application No. 15811173.2, dated Dec. 13, 2017.

Office Action and English translation of Office Action for Korean Patent Application 10-2017-0106906 dated Jan. 10, 2018 for Ember Technologies, Inc., 8 pp.

Office Action dated Jan. 12, 2018, received in Chinese Application No. 201510869257.5.

Chinese Office Action, regarding Application No. 201510869257.5, dated Aug. 30, 2018, 9 pages.

* cited by examiner

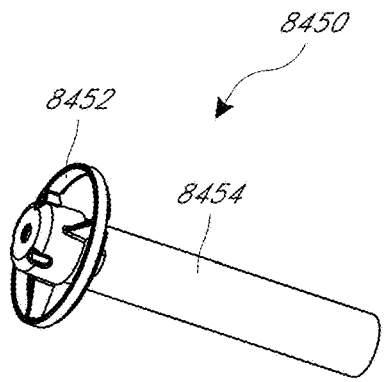
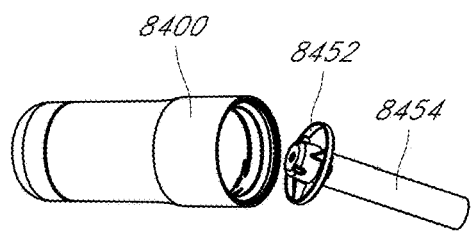
FIG. 13A
FIG. 13B
Screw the tool into the vessel
Pull the engine out
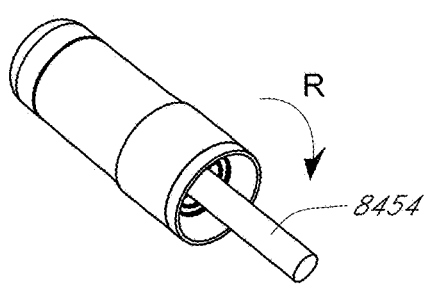
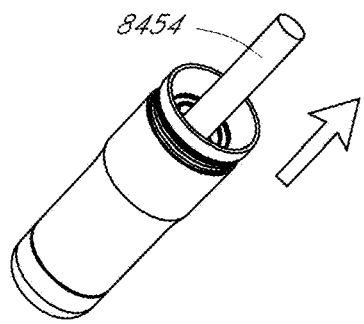
FIG. 13C
FIG. 13D
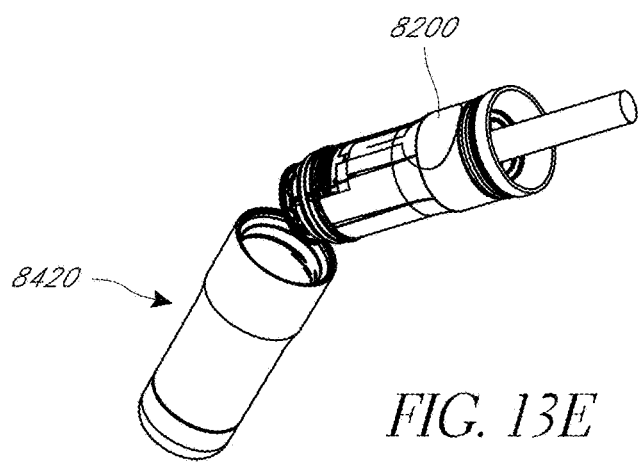
FIG. 13E

HEATED OR COOLED DRINKWARE

RELATED APPLICATIONS

This application claims priority under 35 U.S.C. § 119(e) to U.S. Provisional App. No. 62/401,709, filed Sep. 29, 2016, the entire contents of all of which is hereby incorporated by reference and should be considered a part of this specification.

BACKGROUND

Field

The invention is directed to drinkware and food containers, such as mugs and travel mugs, and more particularly to actively heated or cooled drinkware.

Description of the Related Art

Drinkware (e.g., cups, mugs, travel mugs) are sometimes made of ceramic materials. However, such drinkware passively release of heat based on the heat transfer properties of the ceramic material, and are unable to retain heat for a prolonged period of time so that beverages in the drinkware cool over time.

However, technology for actively heating, or cooling, drinkware is not readily available. Accordingly, there is a need for drinkware (e.g., cups, mugs, travel mugs) that can be actively heated or cooled during use.

SUMMARY

In accordance with another embodiment, an actively heated or cooled cup, mug, travel mug or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more optional power storage elements, and optional control circuitry configured to control the charging of the one or more power storage elements and to control the delivery of electricity from the one or more power storage elements to the one or more heating or cooling elements to maintain a temperature of the liquid at a predetermined drinking temperature or within a predetermined drinking temperature range. A wireless transmitter or receiver and/or transceiver is configured to establish a communication connection with a remote device or mobile electronic device, the transceiver configured to transmit operation information to the remote device or mobile electronic device as well as to receive instructions from the remote device or mobile electronic device. A display screen is on a surface of the body, the display screen being electrically connected to the control circuitry.

In accordance with another embodiment, an actively heated or cooled cup, mug, travel mug or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more temperature sensors configured to sense a temperature of the liquid in the receiving portion, and control circuitry configured to communicate with the one or more temperature sensors and to control the operation of the one or more heating or cooling elements based at least in part on the sensed temperature. A wireless transmitter or transceiver configured to establish a communication connection with a remote mobile phone or tablet computer, wherein the transmitter or transceiver is configured to transmit sensed temperature information or information related to sensed temperature information to the mobile phone or tablet computer to display said sensed temperature information on the mobile phone or tablet computer.

In accordance with another embodiment, an actively heated or cooled cup, mug, travel mug or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more temperature sensors configured to sense a temperature of the liquid in the receiving portion, and control circuitry configured to communicate with the one or more temperature sensors and to control the operation of the one or more heating or cooling elements based at least in part on the sensed temperature. A wireless transmitter or transceiver configured to establish a communication connection with a remote mobile phone or tablet computer. A display screen or indicator lights are on a surface of the body, the display screen or indicator lights being electrically connected to the control circuitry and configured to display the sensed temperature information or display a message and/or visual indication related to the sensed temperature information. The transmitter or transceiver is configured to transmit sensed temperature information or information related to sensed temperature information to the mobile phone or tablet computer to display said sensed temperature information or a message and/or notification related to the sensed temperature on the mobile phone or tablet computer.

In accordance with another embodiment, an actively heated or cooled cup, mug, travel mug or liquid container is provided comprising a body having a receiving portion for receiving and holding a liquid and a heating or cooling system. The heating or cooling system comprises one or more heating or cooling elements configured to actively heat or cool at least a portion of the receiving portion of the body, one or more temperature sensors configured to sense a temperature of the liquid in the receiving portion, and control circuitry configured to communicate with the one or more temperature sensors and to control the operation of the one or more heating or cooling elements based at least in part on the sensed temperature. A wireless receiver or transceiver is configured to establish a communication connection with a remote mobile phone or tablet computer, wherein the receiver or transceiver is configured to receive operating instructions from the remote mobile phone or tablet computer, the control circuitry configured to control the operation of the one or more heating or cooling elements at least in part based on said received operating instructions from the mobile phone or tablet computer.

In accordance with another embodiment, an actively heated or cooled cup, mug, travel mug or liquid container is provided comprising a body having a receiving portion for receiving and holding a liquid and a heating or cooling system. The heating or cooling system comprises one or more heating or cooling elements configured to actively heat or cool at least a portion of the receiving portion of the body, and one or more optional liquid level sensors configured to sense a liquid level in the receiving portion. A wireless transmitter or transceiver is configured to establish a communication connection with a remote mobile phone or tablet computer, wherein the transmitter or transceiver is configured to transmit sensed liquid level information to the mobile phone or tablet computer to display said liquid level information on the mobile phone or tablet computer.

In accordance with one aspect, an actively heated or cooled portable container is provided. The container comprises a portable body having a receiving portion defined by an inner sidewall and inner bottom wall for receiving and holding a liquid, and a heating and cooling system housed in the portable body. The heating and cooling system comprises a cooling element comprising a phase change material disposed in a chamber that surrounds at least a portion of the inner sidewall so that the phase change material is in thermal communication with at least a portion of the inner sidewall of the portable body, the phase change material configured to transition from one phase to a second phase at a predetermined temperature. The heating and cooling system also comprises a heating element in thermal communication with at least a portion of the inner sidewall or inner bottom wall of the portable body. The heating and cooling system also comprises control circuitry disposed in a portion of the portable body, the control circuitry configured to control the operation of the heating element. The heating and cooling system also comprises one or more power storage elements disposed in another portion of the portable body and configured to provide electrical energy to one or both of the heating element and control circuitry. The cooling element removes heat from a liquid disposed in the receiving portion that has a temperature above the predetermined temperature to lower the temperature of the liquid toward the predetermined temperature, and the control circuitry controls the heating element to add heat to the liquid in the receiving portion to maintain the temperature of the liquid at said predetermined temperature or increase the temperature of the liquid above said predetermined temperature.

BRIEF DESCRIPTION OF THE DRAWINGS

FIG. 13A shows a step in removing an engine module from a housing of a drinkware container.

FIG. 13B shows another step in removing an engine module from a housing of a drinkware container.

FIG. 13C shows another step in removing an engine module from a housing of a drinkware container.

FIG. 13D shows another step in removing an engine module from a housing of a drinkware container.

FIG. 13E shows another step in removing an engine module from a housing of a drinkware container.

DETAILED DESCRIPTION

The various embodiments described below refer to a drinkware container. One of skill in the art will understand that the terms "drinkware container" broadly refer to any portable handheld container that can hold a liquid for consumption, and includes containers such as cups, mugs, travel mugs, beer mugs, baby bottles, carafes and other handheld portable liquid containers.

Figure 1:
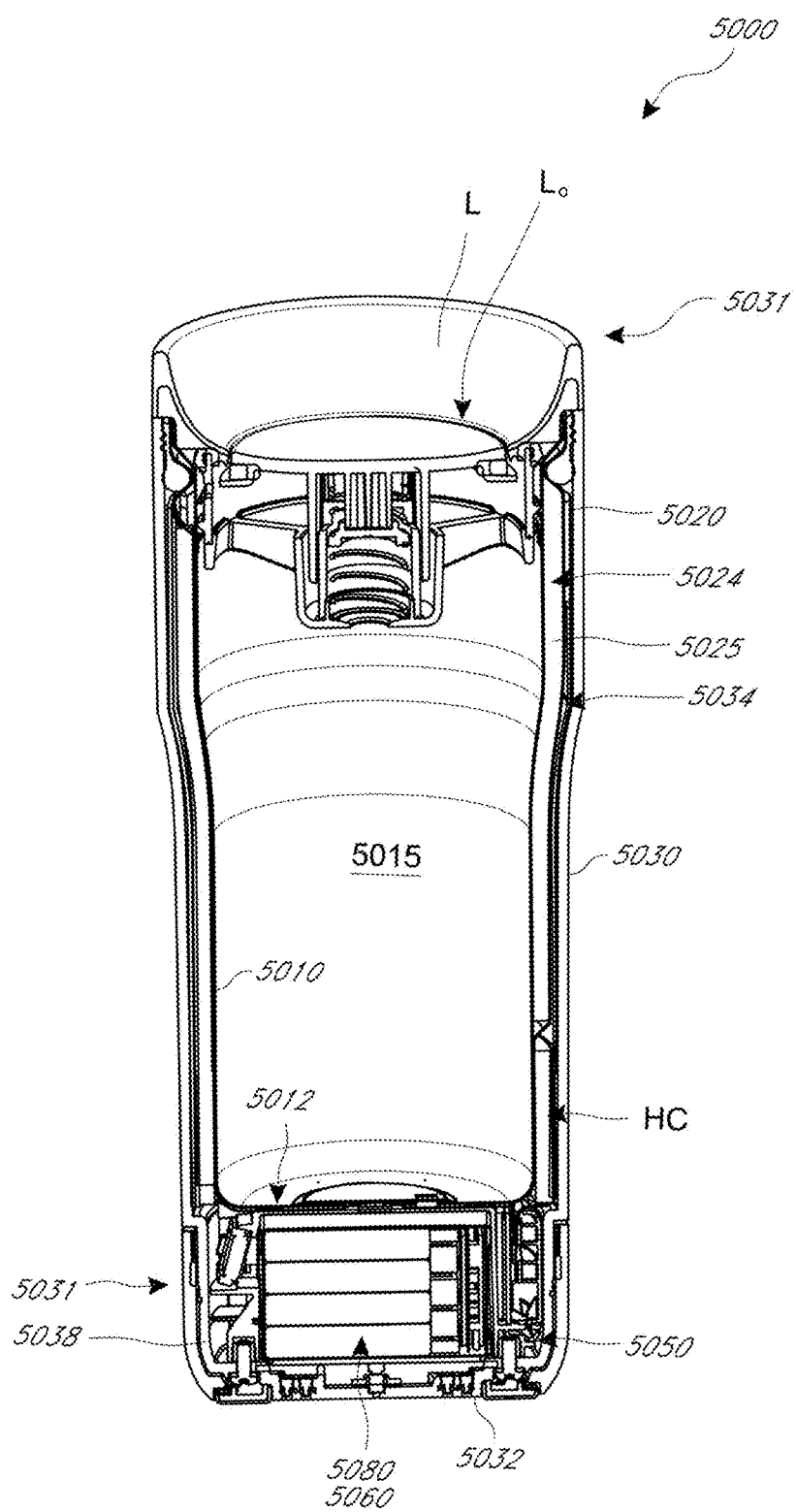
FIG. 1 is a schematic cross-sectional view of an embodiment of a drinkware container.

FIG. 1 shows a lengthwise cross-sectional view of an embodiment of a drinkware container 5000 (hereinafter "container 5000"). As only a cross-section is shown, the other half of the drinkware container 5000 is excluded in FIG. 1 to illustrate the various components of the container 5000. One of skill in the art will understand that the excluded portion of the drinkware container 5000 in FIG. 1 is a mirror image of the portion of the drinkware container 5000 that is shown in FIG. 1. In the illustrated embodiment, the container 5000 is shown as a travel mug. However, as discussed above, the drinkware container 5000 can be other types of containers, such as a cup, mug, beer mug, baby bottle, carafe or other handheld portable liquid containers.

The container 5000 has an inner sidewall 5010 (e.g., a circumferential or cylindrical inner sidewall) and inner bottom wall 5012, which together define a chamber 5015 that receives and holds a liquid therein. The container 5000 also has a second sidewall 5020 (e.g., a circumferential or cylindrical inner sidewall) that is spaced apart from the inner sidewall 5010 so as to define a chamber (e.g., an annular chamber) 5024 between the inner wall 5010 and the second wall 5020. Optionally, the inner sidewall 5010 can be made of metal (e.g., stainless steel). However, in other embodiments, the inner sidewall 5010 can be made of other suitable materials. Optionally, the second sidewall 5020 can be made of the same material as the inner sidewall 5010 (e.g., both the inner sidewall 5010 and the second sidewall 5020 can be made of metal, such as stainless steel). In another embodiment, the second sidewall 5020 can be made of a different material than the inner sidewall 5010; for example, the inner sidewall 5010 can be made of metal, such as stainless steel, and the second sidewall 5020 can be made of a plastic material that insulates the outer portion of the container 5000 from the inner sidewall 5010 and the liquid contents of the chamber 5015. Optionally, the inner sidewall 5010 and the second sidewall 5020 are part of a single piece (e.g., monolithic piece), so that the inner and second sidewall 5010, 5020 are fixed (e.g., not removable) relative to each other.

The chamber 5024 can be filled with a phase change material (PCM) 5025. The PCM 5025 can be a solid-solid phase change material, or a solid-liquid phase change material. The PCM 5025 can be a wax (e.g., Paraffin wax). However, other suitable phase change materials (e.g., a metal) can be used.

The PCM 5025 can be selected to have a predetermined transition (e.g., melting) temperature that generally corresponds to a suitable drinking temperature for a heated liquid. In some embodiments, the predetermined transition temperature can optionally be between 135 degrees F. and 145 degrees F., such as optionally be 140 degrees F. In one embodiment, when the liquid (e.g., hot coffee, hot tea, soup) poured into the chamber 5015 of the container 5000 has a temperature above the predetermined transition temperature, the PCM 5025 can absorb heat from the liquid to cause the PCM 5025 to transition, for example, from a solid to a liquid, thereby decreasing the temperature of the liquid toward the said predetermined temperature. As the temperature of the liquid drops (e.g., via conduction of heat from the liquid through the inner sidewall 5010 to the PCM 5025), the operation of the container 5000 approaches a steady state of operation where the temperature of the liquid approaches the predetermined transition temperature, where it can remain for an extended period of time (e.g., for at least 1 hour, for at least 2 hours, for at least 3 hours, etc.).

The container 5000 can have an outer sidewall 5030 (e.g., a circumferential or cylindrical inner sidewall) that extends from a rim 5031 of the container 5000 to an outer bottom wall 5032. The rim 5031 can optionally partially define a drinking lip 5031 of the container 5000, e.g., along with an opening Lo in a lid L that can removably cover the proximal end of the container 5000. Optionally, the outer sidewall 5030 and outer bottom wall 5032 can be a single piece (e.g., monolithic with no seams). However, in other embodiments, at least a portion of the outer sidewall 5030 can be separate from the bottom wall 5032, as discussed further below. The outer sidewall 5030 can be disposed radially outward from the second sidewall 5020. Optionally, the outer sidewall 5030 can be radially spaced apart from the second sidewall 5020 to define a chamber 5034 (e.g., an annular chamber) therebetween. In one embodiment, the chamber 5034 can provide an air gap between the second sidewall 5020 and outer sidewall 5030, where said air gap can insulate the outer sidewall 5030 from the second sidewall 5020 and the inner sidewall 5010. In other embodiments, the chamber 5034 can be filled with an insulative material (e.g., foam). In still another embodiment, the chamber 5034 can optionally be under vacuum. However, in other embodiments, the outer sidewall 5030 can be adjacent the second sidewall 5020 so that there is no gap therebetween. Optionally, the outer sidewall 5030 can be made of an insulative material (e.g., foam, plastic).

With continued reference to FIG. 1, the container 5000 can optionally have one or more heating elements 5040 disposed about (e.g., circumferentially about) at least a portion of the inner wall 5010 so that it is in direct thermal communication with liquid in the chamber 5015. In the illustrated embodiment, the one or more heating elements 5040 are disposed about at least a portion of the inner wall 5010 at a location below the chamber 5024. The one or more heating elements 5040 are optionally one or more resistive heaters. In one embodiment, the one or more heating elements 5040 can optionally be defined by a trace pattern screen printed onto the surface of the inner wall 5010. A connecting lead line (not shown) can electrically connect the one or more heating elements 5040 to one or more optional power storage elements 5060 disposed in a bottom chamber 5050 and/or control circuitry 5080 disposed in the bottom chamber 5050. For example, in one embodiment such a lead line can extend from the one or more heating elements 5040 downward along the inner bottom wall 5012 to the one or more power storage elements 5060 and/or control circuitry 5080. In one embodiment, the one or more heating elements 5040 can optionally be a thermoelectric element. Though the discussion in this paragraph refers to one or more heating elements 5040, one of skill in the art will recognize that this can also apply to one or more cooling elements or one or more heating and cooling elements (e.g., thermoelectric elements), and that this disclosure is meant to apply to all these options for the container 5000.

In the illustrated embodiment, the outer sidewall 5030 and outer bottom wall 5032 are optionally a single piece (e.g. monolithic with no seams), such that the one or more optional power storage elements 5060 (e.g., batteries, capacitors) and control circuitry 5080 are permanently housed in the chamber 5050. In some embodiments, the power storage elements are excluded. In another embodiment, the outer bottom wall 5032 is removable relative to the outer sidewall 5030 to allow access to the chamber 5050 (e.g., to replace the power storage elements 5060, perform maintenance on the electronics, etc.). In another embodiment, at least a portion of the outer sidewall 5030 can be separate from the outer bottom wall 5032 (and/or at least another portion of the outer sidewall 5030) so that the one or more power storage elements 5060 and control circuitry 5080 are housed in a module that can be removably coupled to the rest of the container 5000. For example, said module can be coupled to a bottom plate via a threaded connection, key-slot connection, magnetic connection, or other suitable connection. In such an embodiment, the lead line from the heating element 5040 can terminate at the bottom plate and establishes an electrical connection with a separate lead line in said module when the module is coupled to the container

Figure 10A:
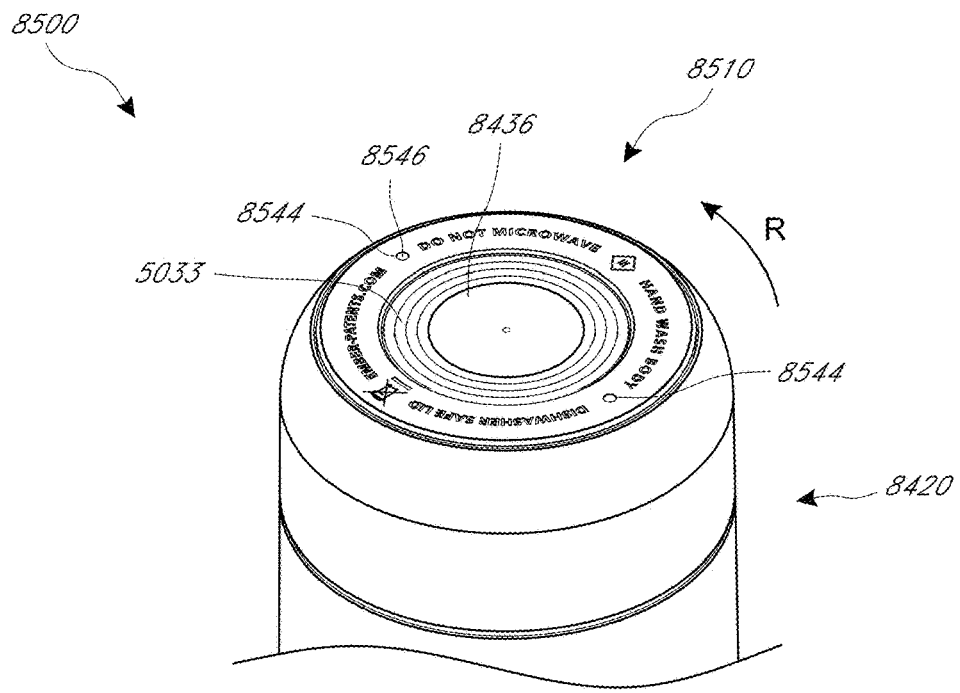
FIG. 10A shows a bottom plate of one embodiment of a drinkware container.
Figure 10B:
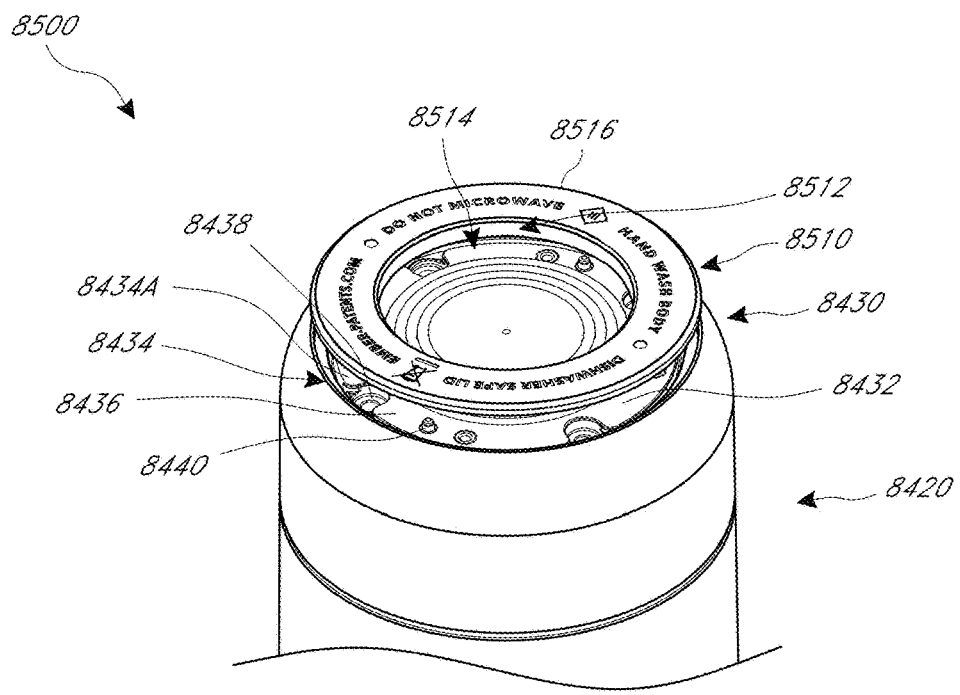
FIG. 10B shows the bottom plate of FIG. 10A decoupled from the drinkware container.

5000. In still another embodiment, the outer bottom wall 5032 can be removably attached to the container 5000 and can be removed to access the control circuitry 5080 and/or one or more power storage elements 5060 for maintenance, testing and/or replacement. In some embodiments, the bottom wall 5032 can have one or more electrical contacts 5033 (see FIG. 10A) on an outer surface thereof that contacts a corresponding electrical contact on a charging or power base, through which the one or more optional power storage elements 5060 can be charged when the container 5000 is disposed on the charging or power base. Said one or more electrical contacts 5033 on the bottom wall 5032 can be circular. Optionally the one or more electrical contacts 5033 are gold plated electrical contact pads or strips.

The control circuitry 5080 can optionally control the charging of the one or more power storage elements (e.g., the control circuitry 5080 can include a charging circuit) can control delivery of power to the heating element 5040. In one embodiment, the control circuitry 5080 can control delivery of power to the heating element 5040 to maintain the liquid in the chamber 5015 at the predetermined temperature. In another embodiment, the control circuitry 5080 can control delivery of power to the heating element 5040 to input heat to the liquid to increase the temperature of the liquid to a user selected temperature. Said user selected temperature can optionally be provided via a user interface on the body of the container 5000. In another embodiment, the user selected temperature can be provided wirelessly to the control circuitry (which can have a receiver) from a portable electronic device (e.g., smart phone or tablet computer), e.g., so that there are no buttons or other controls on the container 5000 that the user manually actuates. In still another embodiment, the temperature can be preselected or preset (e.g., during manufacture). Optionally, the control circuitry 5080 can control delivery of power to the heating element 5040 based at least in part on information from one or more sensors that sense a parameter of quality of the liquid (e.g., temperature, liquid volume or level, acidity, pH) where said one or more sensors can be on a surface of one or both of the inner sidewall 5010 and inner bottom wall 5012. Said sensors can be any of the sensors disclosed herein and can communicate with the control circuitry 5080 in any manner disclosed herein.

During operation, a user can pour a hot liquid into the chamber 5015. If the temperature of the liquid is above the transition temperature of the PCM 5025, heat can be transferred from the liquid to the PCM 5025 to drop the temperature of the liquid in the chamber 5015 until an equilibrium is achieved. The control circuitry 5080 can then operate (e.g., based on the information provided by the sensors) to supply power to the one or more heating elements 5040 to either maintain the temperature of the liquid in the chamber 5015 relatively steady (or within a desired temperature range) for an extended period of time, or to increase the temperature of the liquid in the chamber 5015. Where the one or more power storage elements 5060 are included, they can provide power to the one or more heating elements 5040 and the control circuitry 5080 can control the amount of power provided to the heating elements 5040. Where the one or more power storage elements 5060 are excluded, the container 5000 can be placed on a power base that is connected to an electrical source and the control circuitry 5080 can control the amount of power delivered to the one or more heating elements 5040 from the power base (e.g., via the one or more electrical contacts 5033 on the container 5000 and corresponding electrical contact on the power base).

With continued reference to FIG. 1, the outer sidewall 5030 of the container 5000 can include a lower portion 5038 with a smaller diameter than an upper portion of the outer sidewall 5030 so as to define a stepped portion in a lower portion of the container 5000. The container 5000 can optionally also include a movable sidewall, ring or dial 5031 disposed about the lower portion 5038 and rotatably mounted to the lower portion 5038 about the central axis (e.g., axis of symmetry) of the container 5000. In the illustrated embodiment, the movable sidewall, ring or dial 5031 can rotate relative to the lower portion 5038 (e.g., about the axis of the container 5000), e.g. via a bearing. In one embodiment, the movable sidewall, ring or dial 5031 can have substantially the same outer diameter as the outer sidewall 5030 at a location above the lower portion 5038, so that the movable sidewall, ring or dial 5031 is substantially aligned with the outer sidewall 5030 at said location above the lower portion 5038. In one embodiment, the movable sidewall, ring or dial 5031 can be in operative communication with one or more sensors that can sense the rotation of the movable sidewall 5031 with respect to at least a portion of the outer sidewall 5030 (e.g., with respect to at least a portion of the lower portion 5038). In one embodiment, at least one of said one or more sensors can be an optical sensor. In another embodiment, at least one of said one or more sensors can be a Hall effect sensor. However, other suitable sensors for sensing the movement of the movable sidewall, ring or dial 5031 can be used (e.g., capacitance sensor).

Said one or more sensors can communicate the sensed rotation of the movable sidewall, ring or dial 5031 to the control circuitry 5080, which can control the operation of the one or more heating elements 5040 based at least in part on said sensed rotation. In one embodiment, the control circuitry 5080 can, via an algorithm stored in a memory of the control circuitry 5080, associate an incremental rotation of the movable sidewall, ring or dial 5031 with an incremental change in a user selected temperature (as discussed above), and can operate the one or more heating elements 5040 so that the liquid in the chamber 5015 approaches said user selected temperature. Accordingly, in one embodiment, the movable sidewall, ring or dial 5031 can operate as a temperature dial and be used to change a temperature set point for the container 5000 to which the liquid in the chamber 5015 is to be heated.

With continued reference to FIG. 1, in one embodiment the container 5000 can optionally have one or more capacitance touch sensors (not shown) on the outer sidewall 5030, which the user can actuate to control the operation of the container 5000. Said capacitance touch sensors can be similar to the soft touch sensors discussed above. The capacitance touch sensors can communicate with the control circuitry 5080 (e.g., via a lead line that extends between the one or more sensors and the control circuitry 5080). For example, the user can touch the capacitance touch sensor to unlock or wake up the control circuitry 5080, allowing an adjustment in the user selected temperature (as discussed above) by rotating the movable sidewall, ring or dial 5031. After a period of time (which can be a set period of time saved in a memory of the control circuitry 5080), the control circuitry 5080 can lock out the control of the container 5000 such that further rotation of the movable sidewall 5031 will not adjust the user selected temperature. If the user wishes to again adjust the user selected temperature, they can again contact the capacitance touch sensor to again unlock the control of the container 5000, and thereby adjust the user selected temperature via the rotation of the movable sidewall, ring or dial 5031.

In one embodiment, the one or more capacitance touch sensors can be used to turn one and off the electronics of the container 5000. For example, in embodiments where there is only one capacitance touch sensor, the user can press the sensor for an X amount of time (e.g., 2 seconds, 3 seconds, 5 seconds) to turn the electronics (e.g., control circuitry 5080) on if it was previously off, or to turn the electronics off if they were previously on.

In one embodiment, the container 5000 can optionally include a visual indication screen on the outer sidewall 5030, which can communicate with the control circuitry 5080 and can display information associated with the operation of the container 5000. For example, the visual indication screen can indicate when the control circuitry is in operation (e.g., "ON"). In another example, the visual indication screen can indicate the user selected temperature, e.g., as the user rotates the movable sidewall, ring or dial 5031 to adjust the user selected temperature, as discussed above. In still another embodiment, the visual indication screen can display information (e.g., the user's name) communicated to the control circuitry 5080 from a mobile electronic device (e.g., via Bluetooth or other wireless communication method) of via the internet from a remote computer, or display other operational information (e.g., liquid level in container 5000, such as "HALF FULL", "QUARTER FULL", battery charge level or operating time left before battery needs charging).

Figure 2:
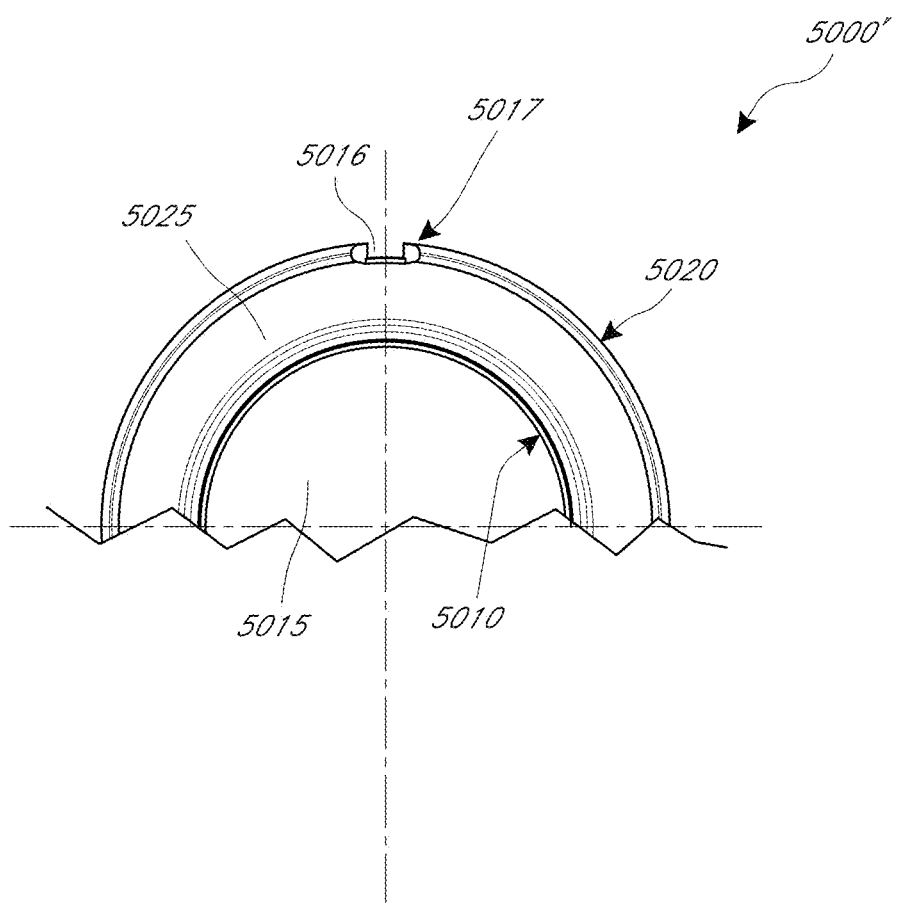
FIG. 2 is a schematic partial transverse cross-sectional view of an embodiment of a drinkware container.

As shown in FIG. 2, in one embodiment, the container 5000' can include one or more sensors 5016 that can sense information indicative of a liquid level in the chamber 5015. Such sensors can be any of the types of sensors disclosed herein (e.g., capacitance sensors, ultrasound sensors, temperature sensors). In one embodiment, the one or more sensors 5016 can be a plurality of sensors 5016 that are in contact with the inner sidewall 5010 along a length (e.g., the entire length, ¾ of the length, ½ of the length, ¼ of the length, etc.) of the inner sidewall 5010 and communicate the sensed temperature information to the control circuitry 5080 (e.g., via one or more lead lines between the sensors 5016 and the control circuitry 5080). For example, the plurality of sensors 5016 can be mounted to a flex strip attached to (e.g., adhered to, such as with a thermally conductive adhesive) the inner sidewall 5010. As shown in FIG. 2, the plurality of sensors 5016 are optionally on the outer surface of the inner sidewall 5010 so as not to be within the chamber 5015. The strip of sensors 5016 are optionally positioned against the outer surface of the inner sidewall 5010 at a recessed location 5017 where the second sidewall 5020 and PCM 5025 are not present; as shown in FIG. 2, the second sidewall 5020 optionally contacts the inner sidewall 5010 on either side of said recess 5017 in which the strip of sensors 5016 is placed. In one embodiment, the plurality of sensors 5016 can be Negative Temperature Coefficient (NTC) thermistors.

The control circuitry 5080 can optionally determine (e.g., based on one or more algorithms stored in a memory thereof) the liquid level in the chamber 5015 based at least in part on the sensed information (e.g., sensed temperature or information indicative of temperature) communicated from the plurality of sensors 5016. In one embodiment, the control circuitry 5080 can, based on the information sensed by the plurality of sensors 5016, determine the differential in temperature between any two adjacent sensors. Where such differential exceeds a certain amount (e.g., 5 degrees F., 10 degrees F., 15 degrees F.) and/or indicates a temperature higher than ambient by a certain amount, the control circuitry 5080 can determine that the liquid level in the chamber 5015 is between said two sensors of the plurality of sensors 5016 that exhibit this temperature differential, and can indicate the location of liquid level (e.g., based on the arrangement of the plurality of sensors 5016 vertically along the inner sidewall 5010), such as by communicating information associated with the determined liquid level (e.g., to a visual indication screen on the container 5000, to a mobile electronic device associated with the container 5000, etc.). Said information associated with the determined liquid level that is communicated to the user can be in the form of a quantitative value provided to the user (e.g., level at 6/10, 5/10, 1/10) or qualitative level (e.g., "half full", "quarter full", etc.). In another embodiment, said information associated with the determined liquid level can be communicated via a visual graphic to the user (e.g., a chamber shown half full, a quarter full, etc.) without any text or numerical indication of the level.

Optionally, the plurality of sensors 5016 are not calibrated and the control circuitry 5080 uses the relative change in sensed temperature (or relative change in sensed information indicative of temperature) from the plurality of sensors 5016 to determine the liquid level in the chamber 5015. Alternatively, the plurality of sensors 5016 can be calibrated when the chamber 5015 has been filled entirely and the temperature of the liquid in the chamber 5015 has stabilized to increase the accuracy of the sensors 5016. For example, such sensors 5016 with increased accuracy can be used to indicate not only the liquid level in the chamber 5015, but also the level of another substance (e.g., foam) on top of the liquid in the chamber 5015.

As discussed previously, the sensed liquid level, such as the level determined based on information from the plurality of sensors 5016, can optionally be combined with a sensed tilting of the container 5000 (e.g., via a gyroscope). Therefore, when the tilt sensors senses that the container 5000 has been titled by more than a predetermined amount from vertical (e.g., more than 25 degrees from vertical, etc.), the control circuitry 5080 can turn off power to the one or more heating (or cooling) elements 5040, and can cease control based on information provided from the sensors, until the sensed orientation of the container 5000 is less than the predetermined amount (e.g., less than 25 degrees from vertical, etc.).

Figure 3:
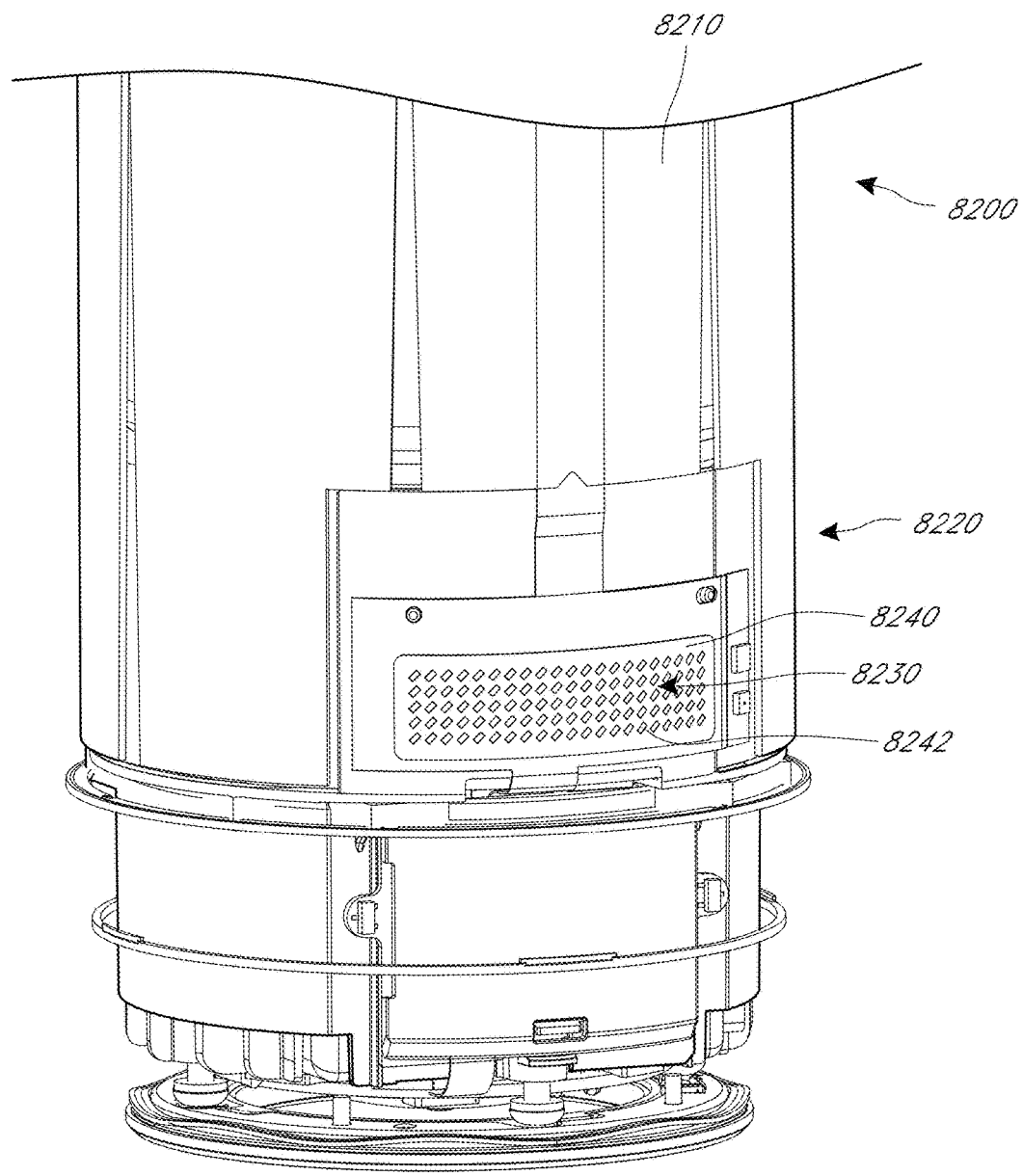
FIG. 3 is a partial view of a disassembled drinkware container assembly with a light gasket.

FIG. 3 illustrates a partial view of an engine module 8200 for use in one embodiment of a drinkware container, such as the container 5000 and 8400. The engine module 8200 can optionally include an insulative layer 8210 disposed around at least a portion of a receptacle sized to receive and hold a liquid (e.g., coffee, tea, water, etc.). The engine module 8200 can optionally also include a digital display 8220 with one or more lighting elements 8230. The one or more lighting elements 8230 are optionally one or more light emitting diodes (LEDs). In one embodiment, the LEDs 8230 can generate white light. In another embodiment, the LEDs 8230 can generate a colored light. In still another embodiment, at least some of the LEDs 8230 can generate white light and the remainder of the LEDs 8230 can generate a colored light. The engine module 8200 can also optionally include a gasket 8240 with a plurality of openings 8242 sized to at least partially receive a plurality of LEDs 8230 therein. The gasket 8240 can optionally be made of a resilient material (e.g., rubber, plastic, silicone). In one embodiment, the gasket 8240 can be made of Shore A 80 silicone; in other embodiments, the gasket 8240 can have other durometers. In other embodiments, the gasket 8240 can be made of other suitable materials (e.g., metal, polymer, ceramic). In the illustrated embodiment the gasket 8240 has a thickness of about 0.01 inches to about 1 inch, such as 0.1 inches, 0.3 inches, or 0.5 inches, though in other embodiments the gasket 8240 can have a thickness greater than or smaller than these values. In one embodiment, the gasket 8240 has a thickness that is at least a great as a length of the LEDs 8230. In one embodiment, the gasket 8240 is held in place in a press-fit manner over the LEDs 8230. In another embodiment, the gasket 8240 is held in place at least in part by an adhesive on a surface of the gasket 8240 that contacts the engine module 8200. Advantageously, the gasket 8240 remains in place (e.g., while inserting and removing the engine module 8200 from a housing of the drinkware container, such as the drinkware container 8400 described below).

Figure 4:
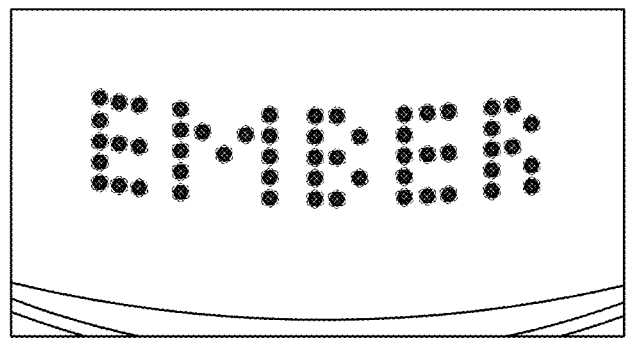
FIG. 4 is a view of a lit digital display of one embodiment of a drinkware container assembly that excludes a light gasket.
Figure 5:
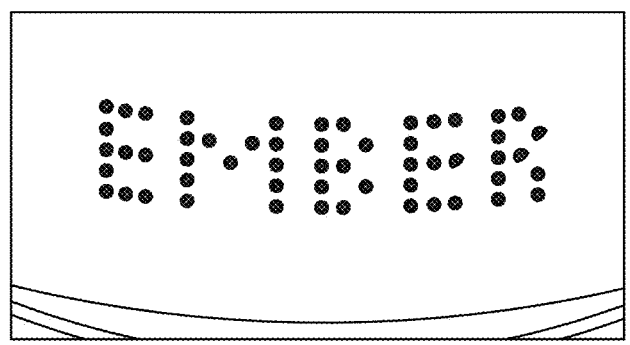
FIG. 5 is a view of a lit digital display of one embodiment of a drinkware container assembly that includes a light gasket.
Figure 6:
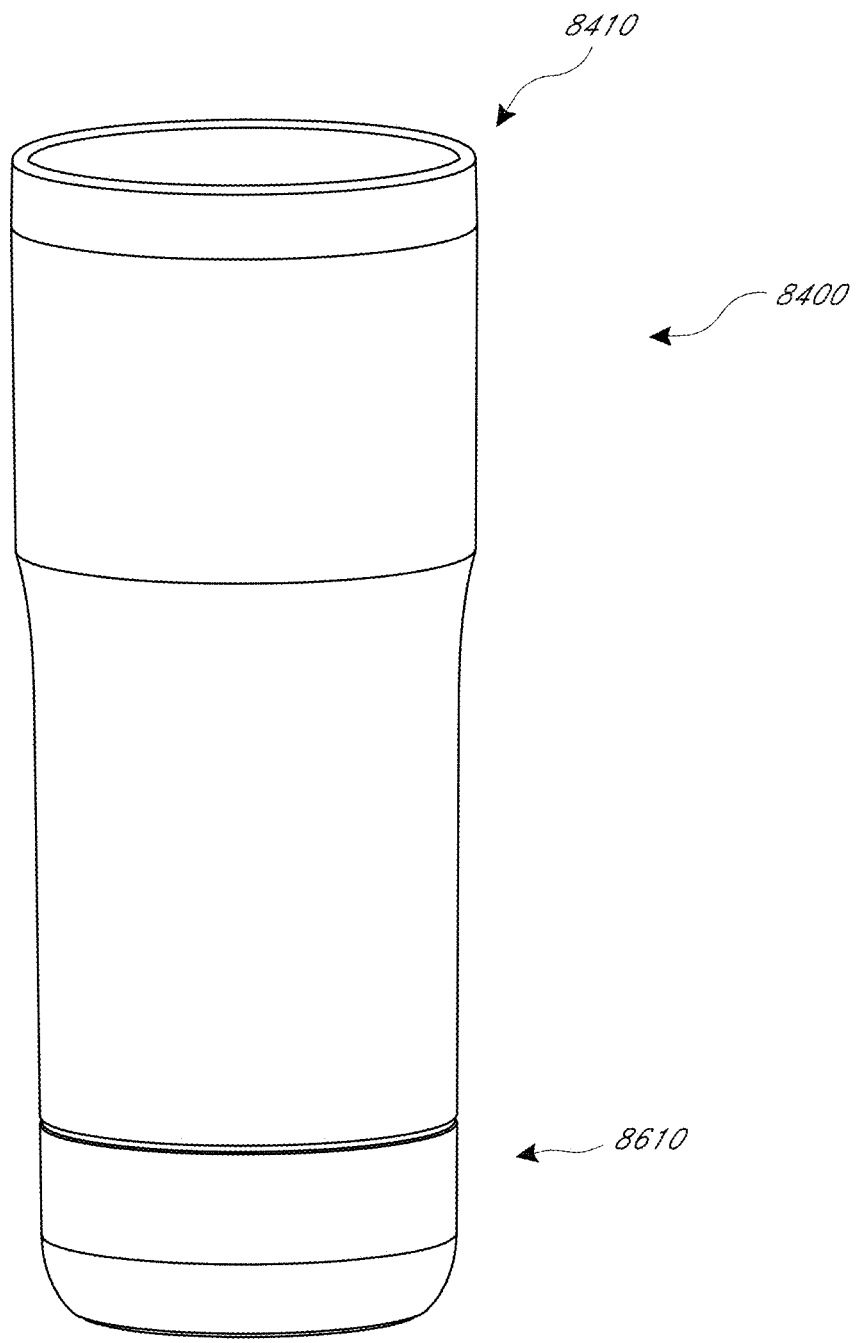
FIG. 6 is a perspective view of one embodiment of a drinkware container.

With continued reference to FIGS. 3-5, the gasket 8240 advantageously directs the light generated by the LED's 8230 in a linear fashion through the digital display 8220 and inhibits light from the LEDs 8230 from being directed in a lateral or sideway manner (e.g., prevents light from the LEDs 8230 from bleeding sideways and distorting the image in the digital display 8220). FIG. 4 shows the digital display 8220 without the use of the gasket 8240, and FIG. 5 shows the digital display 8220 with the use of the gasket 8240. As shown in these figures, the images from the digital display 8220 are crisper when the gasket 8240 is used, making the image on the digital display 8220 easier to read.

FIGS. 6-9 show a drinkware container 8400 and one embodiment of a lid 8410 used with the drinkware container 8400. The container 8400 in one embodiment is similar to the container 500 and includes similar components. The drinkware container 8400 is optionally a travel mug 8400. However, in other embodiments, the drinkware container can be other containers disclosed herein (e.g., carafe, water bottle, baby bottle, sippy cup, beer mug liquid container, soup container, etc.).

The lid 8410 can include a proximal portion 3412 and a distal portion 3414. In one embodiment, in use the proximal portion 3412 can be disposed outside the receptacle volume 8210 (see FIG. 10D) of the drinkware container 8400 and the distal portion 3414 can optionally be disposed inside the receptacle volume 8210 of the drinkware container 8400.

The proximal portion can optionally include a circumferential lip 3416 that extends downward from a top edge 3418 of the lid 8410 to a base 3420, defining a cavity 3421 between the base 3420 and the top edge 3418. The base 3420 is movable relative to the lip 3416 between a closed position (best seen in FIGS. 6-7), in which the base 3420 contacts the lip 3416 along a circumferential joint edge 3417, and an open position in which the base 3420 is axially spaced apart from the ledge 3418 so as to define a circumferential gap therebetween at the joint edge 3417. The gap can optionally be between about 0.01 and about 1 inch, such as 0.05 inches, 0.1 inches, 0.15 inches, 0.25 inches or 0.5 inches, but in other embodiments can have other gap sizes. The base 3420 can optionally have a generally circular shape with a diameter of about 50 mm. However, in other embodiments, the base 3420 can have other suitable shapes or diameters.

Figure 7:
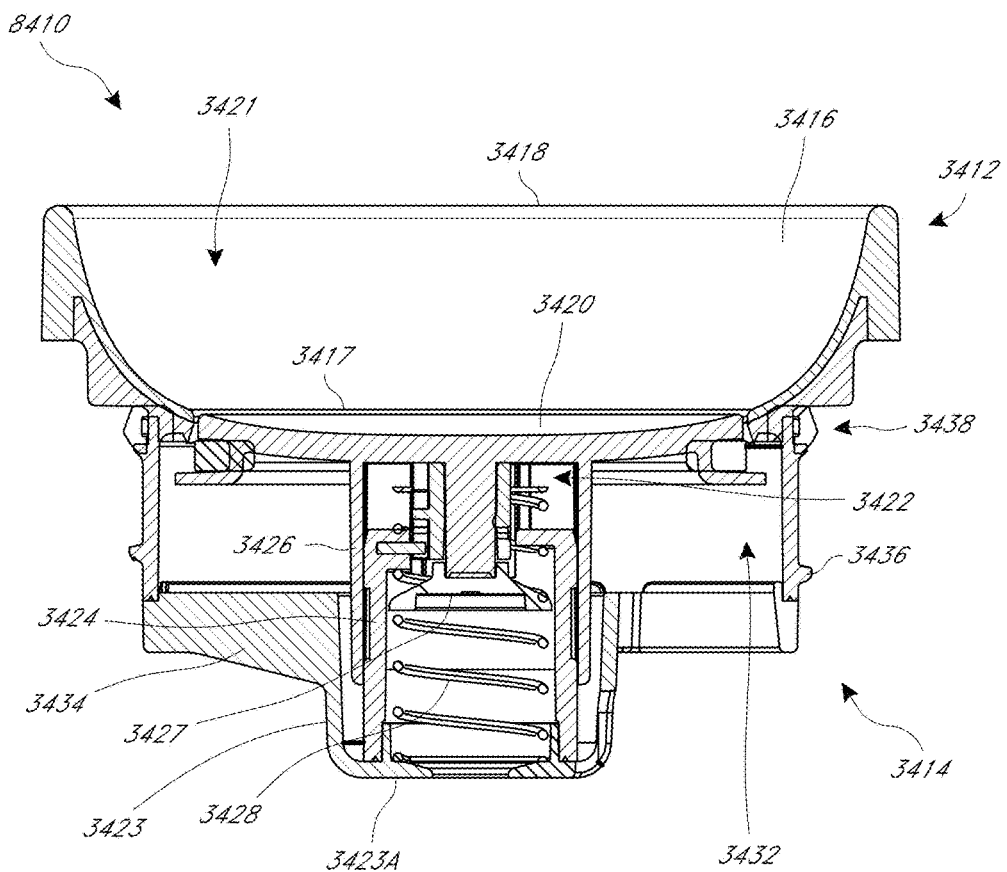
FIG. 7 is a cross-sectional side view of one embodiment of a lid for use with the drinkware container of FIG. 6.
Figure 8:
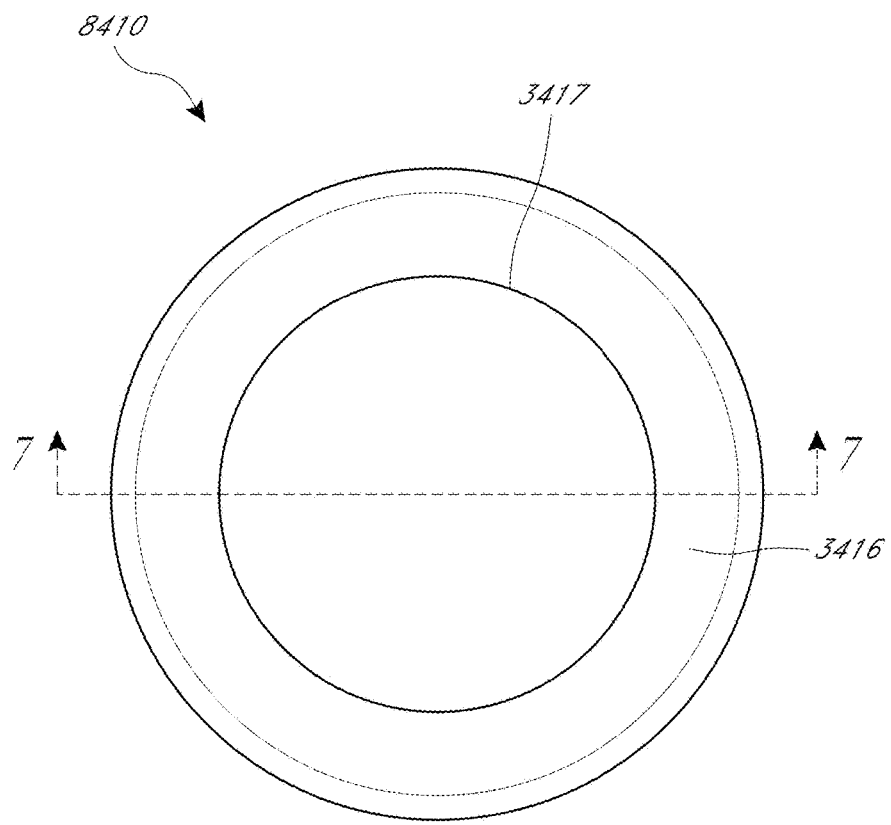
FIG. 8 is a top view of the lid of FIG. 6.
Figure 9:
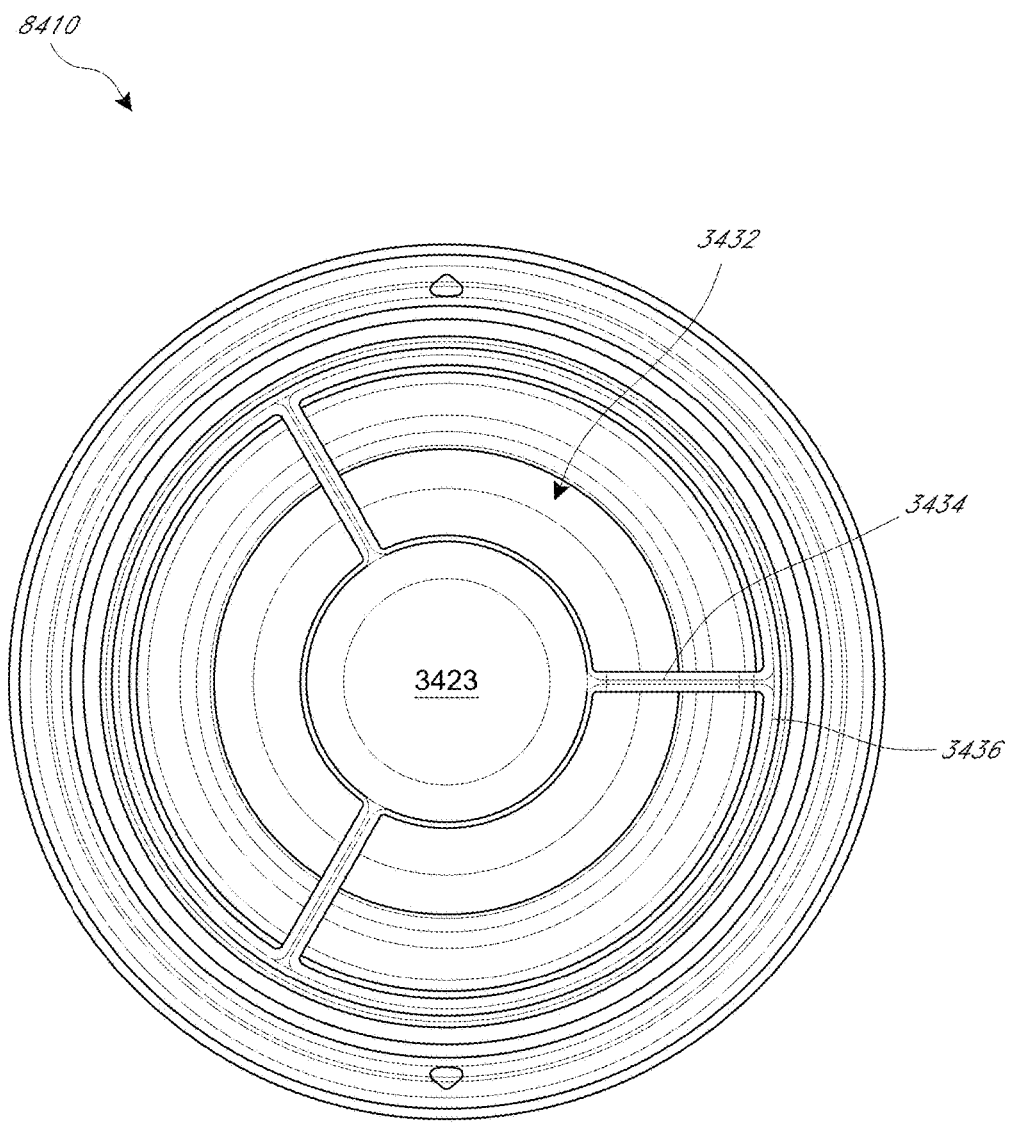
FIG. 9 is a bottom view of the lid of FIG. 6.

With continued reference to FIGS. 7-9, the distal portion 3414 of the lid 8410 includes a housing 3423 that encloses a first sleeve 3424 and a second sleeve 3426 that can slide telescopically relative to the first sleeve 3424. The second sleeve 3426 is optionally attached to an underside of the base 3420 and can optionally have an inner diameter larger than an outer diameter of the first sleeve 3424. In another embodiment, the second sleeve 3426 can have an outer diameter that is smaller than an inner diameter of the first sleeve 3424.

The lid 8410 can also optionally include an indexing actuator 3422 on an underside of the base 3420 that is circumscribed by the second sleeve 3426. The indexing actuator 3422 at least partially extends into the first sleeve 3424 during actuation of the lid 8410 between the open and closed positions. A distal end 3427 of the indexing actuator 3422 contacts a compression spring 3428 (e.g., coil spring, resilient bumper) disposed between the distal end 3427 and a base 3423A of the housing 3423. The compression spring 3428 applies a force against the base 3420, via the indexing actuator 3422, biasing the base 3420 toward contact with the lip 3416 (e.g., to provide a closed position or contact between the base 3420 and the lip 3416 at the circumferential joint 3417). The indexing actuator 3422 operates like a push button actuator (e.g., similar to a push button actuator of a retractable pen), and can include a first cam member that reciprocatingly engages a second cam member to position the base 3420 in at least two axial positions, one position being the base 3420 in contact with the lip 3416 at the circumferential joint 3417 and another position being the base 3420 spaced apart from the lip 3416 so as to define a gap at the circumferential joint 3417. One of skill in the art will recognize that the cams can engage in more than two positions (e.g., to define more than one gap size when the base 3420 is spaced from the lip 3416).

The lid 8410 can optionally further include a bellows that seals a space between the housing 3423 and the second sleeve 3426 to inhibit (e.g., prevent) leakage of liquid into the housing 3423, first or second sleeves 3424, 3426 or indexing actuator 3422.

The distal portion 3414 of the lid 8410 can define one or more openings 3432 between partitions 3434 that connect the housing 3423 with an outer circumferential wall 3436 of the lid 8410. The lid 8410 can optionally also have one or more seals 3438 (e.g., O-rings) to seal the lid 8410 against a wall of the receptacle 8210 (see FIG. 10D) of the drinkware container 8400 to inhibit (e.g., prevent) liquid from passing through the junction between the proximal portion 3412 and the receptacle wall of the drinkware container 8400.

In operation, the base 3420 can be in sealing engagement with the lip 3416 to inhibit (e.g., prevent) liquid from passing through the circumferential joint 3417 (e.g., even if the drinkware container 8400 is tipped on its side, such as laying horizontally). The base 3420 can have one or more seals (e.g., O-rings) that seal against the lip 3416 (e.g., under the spring force applied by the compression spring 3428) when in the closed position. When the user is ready to consume the beverage in the drinkware container 8400, the base 8420 is pressed down, causing the indexing actuator 3422 to reposition the base 8420 to a position that defines the gap between the base 8420 and the lip 8416. The user can then tilt the drinkware container 8400 and place their lips on the lip 8416 to consume the liquid that passes through the openings 3432 between the partitions 3434 and passes through the gap between the base 8420 and the lip 8416 defined at least in part by the circumferential junction 3417. Advantageously, the gap is circumferentially defined about the entire circumference of the base 3420, allowing the user to advantageously consume the beverage irrespective of the angular orientation of the drinkware container 8400 when the user raises it to their lips. Unlike existing travel mugs, the user does not need to first locate the drinking spout on the drinkware container 8400, since the drinking passage is defined along the entire circumference of the base 8420, and therefore does not need to interrupt (e.g., take their eyes off) what they are doing (e.g., reading, working, driving) before they can drink the beverage. Once the user is finished or no longer wants to drink the beverage, he or she can press down on the base 8420 again, causing the indexing actuator 3422 to reposition the base 8420 (e.g., biased by the spring 3428) to a position in sealing engagement with the lip 8416 to inhibit fluid flow out of the lid 8410, as discussed above.

Figure 10C:
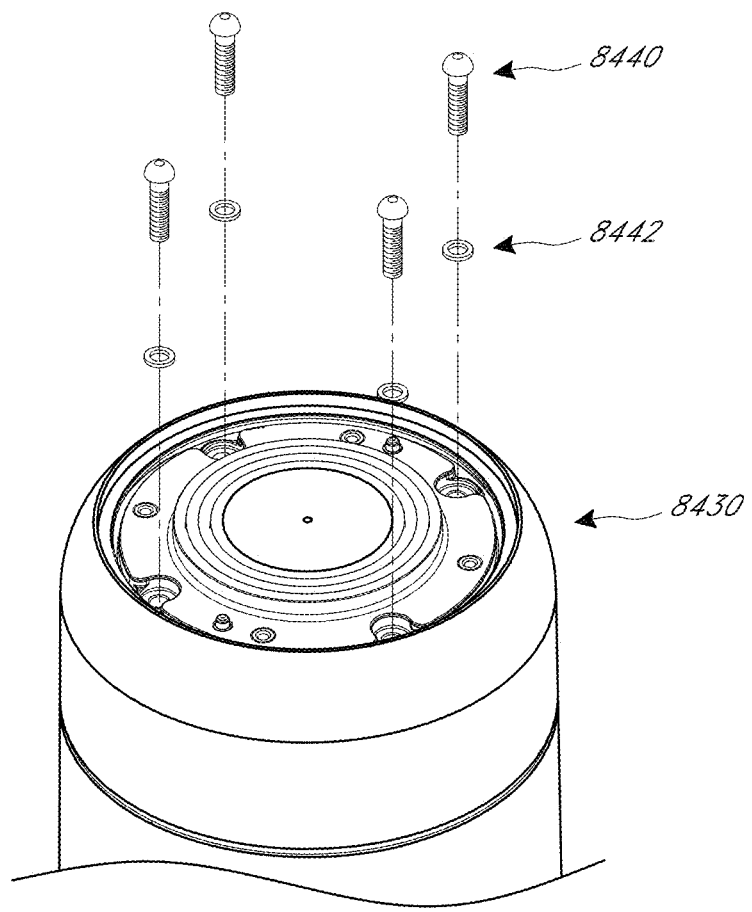
FIG. 10C shows a frame on the distal end of the housing of the drinkware container with the bottom plate removed.
Figure 10D:
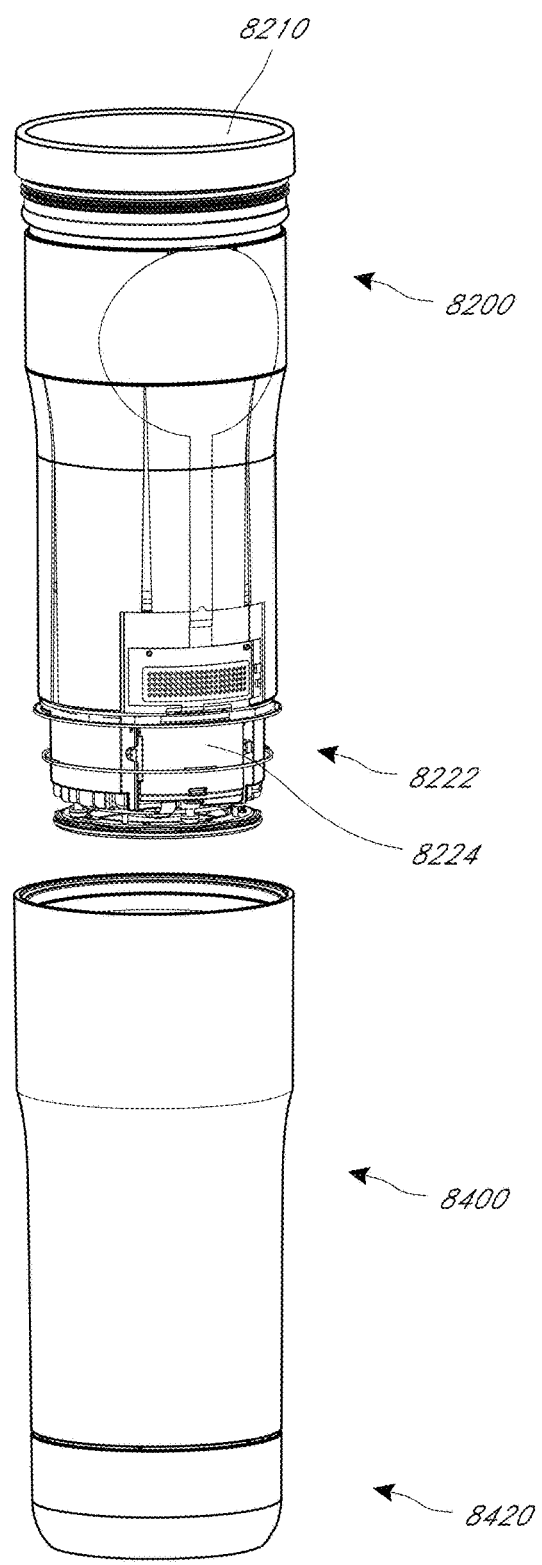
FIG. 10D shows an exploded view of the drinkware container, with the engine module removed from the outer housing.
Figure 11A:
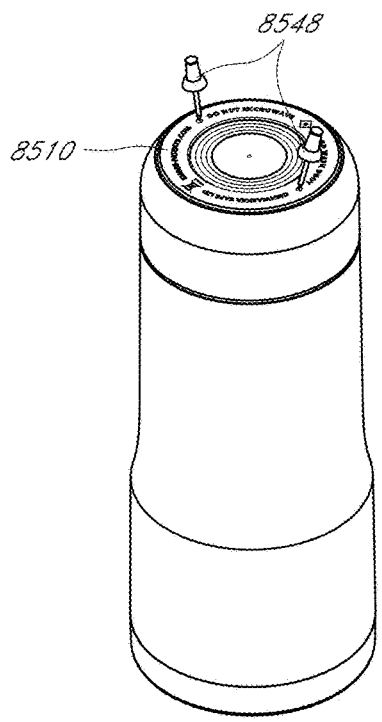
FIG. 11A shows one step in removing the bottom plate from the drinkware container.
Figure 11B:
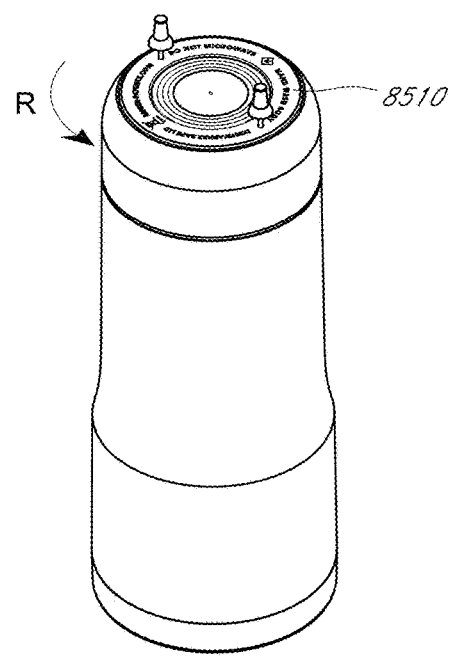
FIG. 11B shows another step in removing the bottom plate from the drinkware container.
Figure 11C:
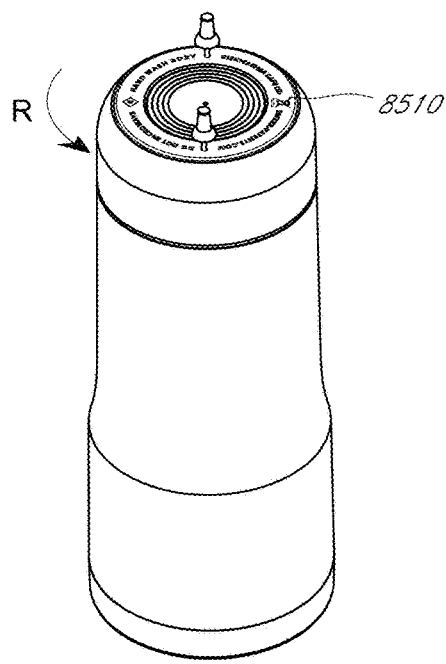
FIG. 11C shows another step in removing the bottom plate from the drinkware container.
Figure 11D:
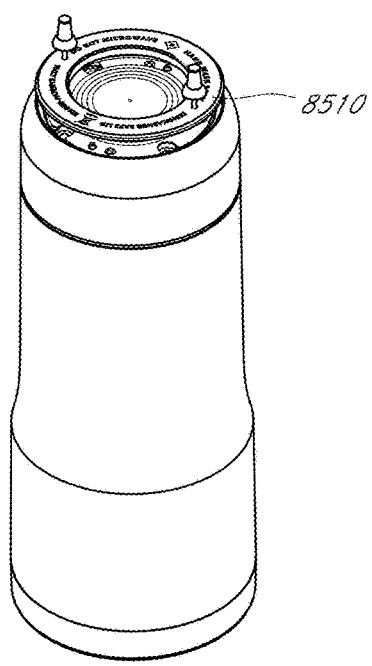
FIG. 11D shows another step in removing the bottom plate from the drinkware container.

FIGS. 10A-10F show one embodiment of a bottom plate assembly 8500 for use with a drinkware container, such as the drinkware container 8400. The bottom plate assembly 8500 can include a plate 8510. In the illustrated embodiment, the plate 8510 has an inner perimeter 8512 that defines an opening 8514 and an outer perimeter 8516. The plate 8510 can removably couple to a distal end of a housing 8420 of the drinkware container 8400. In the illustrated embodiment, the opening 8514 can at least partially receive a base 8436 of the engine module 8200 therein when the plate 8510 is coupled to the housing 8420. The plate 8510 can attach to a frame 8430 on the distal end of the housing 8420. In one embodiment, the frame 8430 is removably coupled to a distal end of the engine module 8200 via one or more fasteners 8440 (e.g., screws). Optionally, as shown in FIG. 10C, the frame 8430 can be coupled to the distal end of the engine module 8420 with the one or more fasteners 8440 and one or more washers 8442 aligned with the fasteners 8440. Once the fasteners 8440 are removed, the engine module 8200 can be removed axially from the housing 8420 (e.g., removed from a proximal end of the housing 8420), as shown in FIG. 10D.

The frame 8430 can have a generally annular surface 8432, one or more slots 8434 defined along a circumference of the annular surface 8432 by a raised surface 8434A relative to the annular surface 8432. The frame 8430 can also have one or more resilient leaf springs 8436 that extend at an angle relative to the annular surface 8432 to define a gap 8436A therebetween. In the illustrated embodiment, each of the one or more resilient leaf springs 8436 is spaced from one of the one or more slots 8434 by an opening 8438.

The plate 8510 can have one or more hook members on an underside the plate 8510 that are sized to fit in the slots 8434 when the plate 8510 is coupled to the housing 8420. The plate 8510 can also have one or locking ribs spaced from the hook members and that can extend into the openings 8438 between the one or more slots 8434 and the one or more resilient leaf springs 8436. The angled leaf springs 8436 can inhibit inadvertent decoupling of the plate 8510 from the housing 8420 by bearing against the one or more locking ribs if the hook members start to slide out of the slots 8434. To decouple and remove the plate 8510 from the housing 8420, the leaf springs 8436 are pressed down (as described below) and the plate 8510 rotated (e.g., counter clockwise) to allow the locking ribs to slide over the leaf springs 8436 and allow the hook members to slide out of the slots 8434, thereby allowing the plate 8510 to be removed. The plate 8510 can have one or more openings 8544 that can optionally be filled with a material 8546 (e.g., resilient material). The leaf springs 8436 can be pressed down by inserting a pin 8548 into the openings 8544 that are located over the leaf springs 8436. In one embodiment, the plate 8510 is coupled to the distal end of the housing 8420 by placing the plate 8510 against the distal end of the housing 8420 and rotating the plate 8510 (e.g., clockwise) until the locking ribs pass over the angled leaf springs 8436 and the hook members side into a locking position within the slots 8434.

With reference to FIGS. 11A-11D, one method for removing the plate 8510 from the housing 8420 is illustrated. As discussed above, in one embodiment, pins 8548 are inserted into the openings 8544 to press down on the leaf springs 8436. While holding the pins 8548 down, the plate 8510 is rotated counter clockwise (e.g., so that the locking ribs 8519 slide over the leaf springs 8436 and allow the hook members 8518 to slide out of the slots 8434), after which the plate 8510 can be lifted up off the distal end of the housing 8420.

Figure 12A:
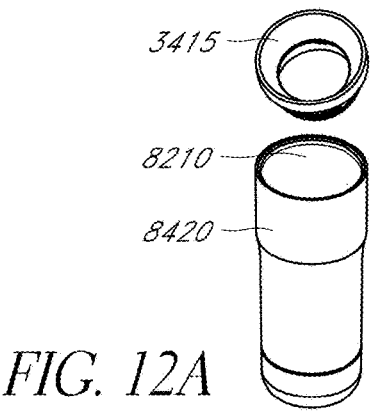
FIG. 12A shows a step in removing an engine module from a housing of a drinkware container.
Figure 12B:
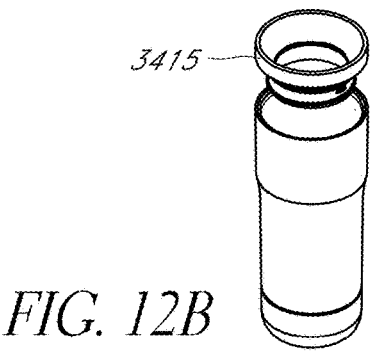
FIG. 12B shows another step in removing an engine module from a housing of a drinkware container.
Figure 12C:
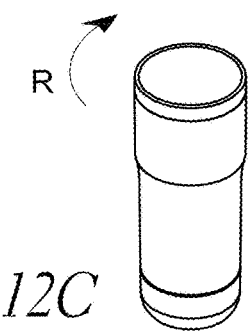
FIG. 12C shows another step in removing an engine module from a housing of a drinkware container.
Figure 12D:
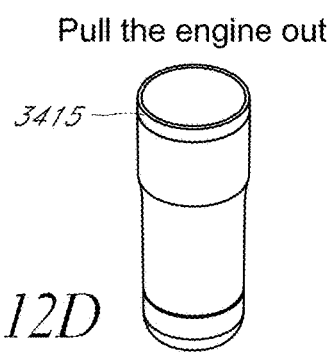
FIG. 12D shows another step in removing an engine module from a housing of a drinkware container.
Figure 12E:
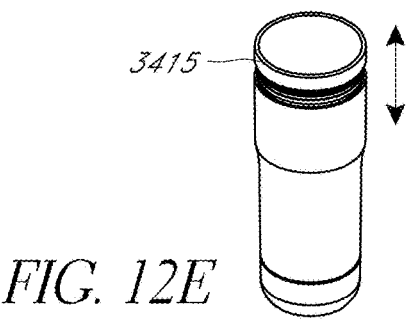
FIG. 12E shows another step in removing an engine module from a housing of a drinkware container.
Figure 12F:
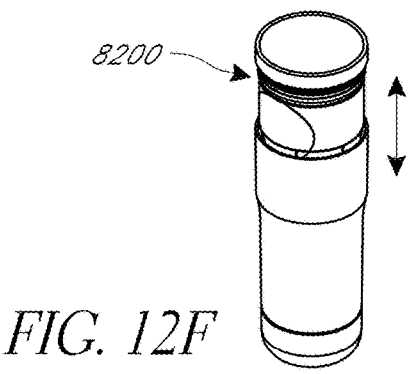
FIG. 12F shows another step in removing an engine module from a housing of a drinkware container.

FIGS. 12A-12F show one embodiment of a process for removing the engine module 8200 from the housing 8420 of the drinkware container 8400 (e.g., after the plate 8510 has been removed, as described above, and the fasteners 8440 coupling the frame 8430 to the housing 8420 have been removed). In the illustrated embodiment, a lid 3415 can be inserted into the proximal opening 8210 of the housing 8420 of the drinkware container 8400 and rotated (e.g., clockwise). The user can insert their hand through an opening in the lid 3415 and contact an inner wall of the engine module 8200, as shown in FIG. 12D. The user can then pull on the engine module 8200 relative to the housing 8420 to axially remove the engine module 8200 from the housing 8420, as shown in FIGS. 12E-12F.

FIGS. 13A-13E show another embodiment of a process for removing the engine module 8200 from the housing 8420 of the drinkware container 8400 (e.g., after the plate 8510 has been removed, as described above, and the fasteners 8440 coupling the frame 8430 to the housing 8420 have been removed). In the illustrated embodiment, a tool 8450 having a ring 8452 and post 8454 can be inserted into the proximal opening 8210 of the housing 8420 of the drinkware container 8400 so that the ring 8452 engages an inner surface of the engine module 8200, as shown in FIGS. 13A-13B. Once inserted, the tool 8450 can optionally be rotated (e.g., clockwise) and the engine module 8200 pulled relative to the housing 8420 to axially remove the engine module 8200 from the housing 8420, as shown in FIGS. 13D-13E.

Figure 14:
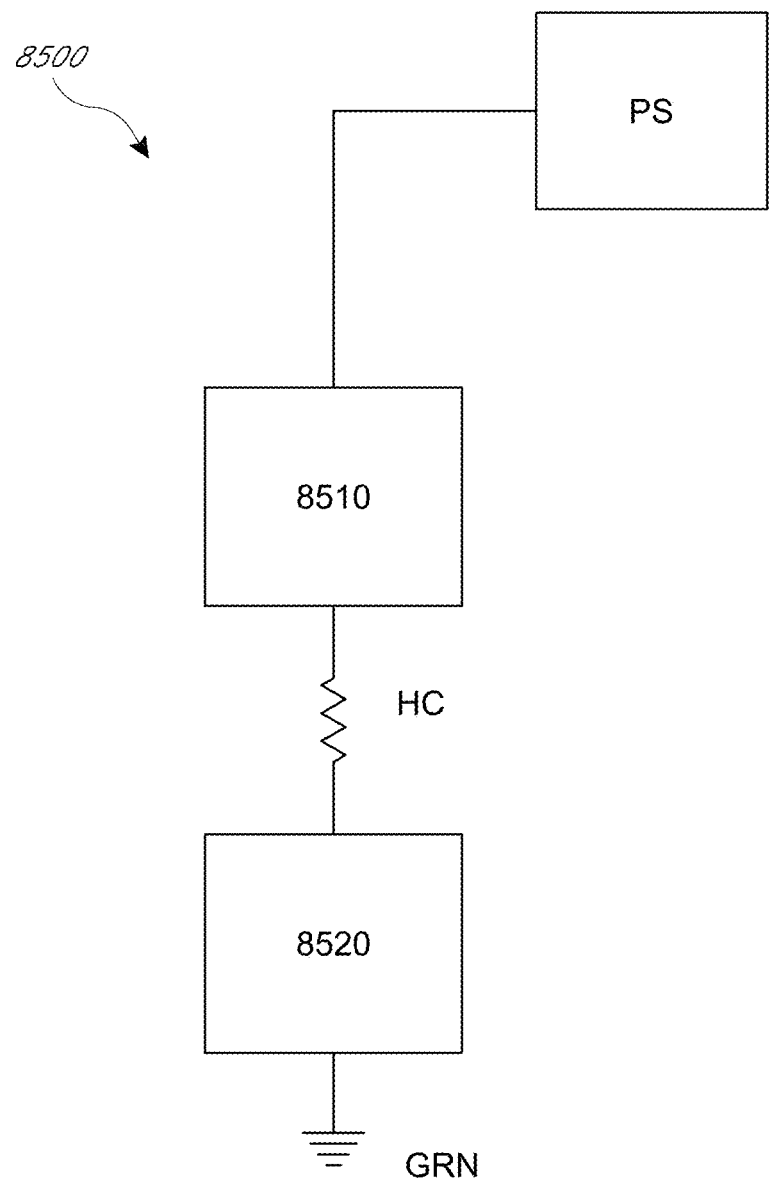
FIG. 14 shows one embodiment of schematic temperature control circuit.
Figure 15:
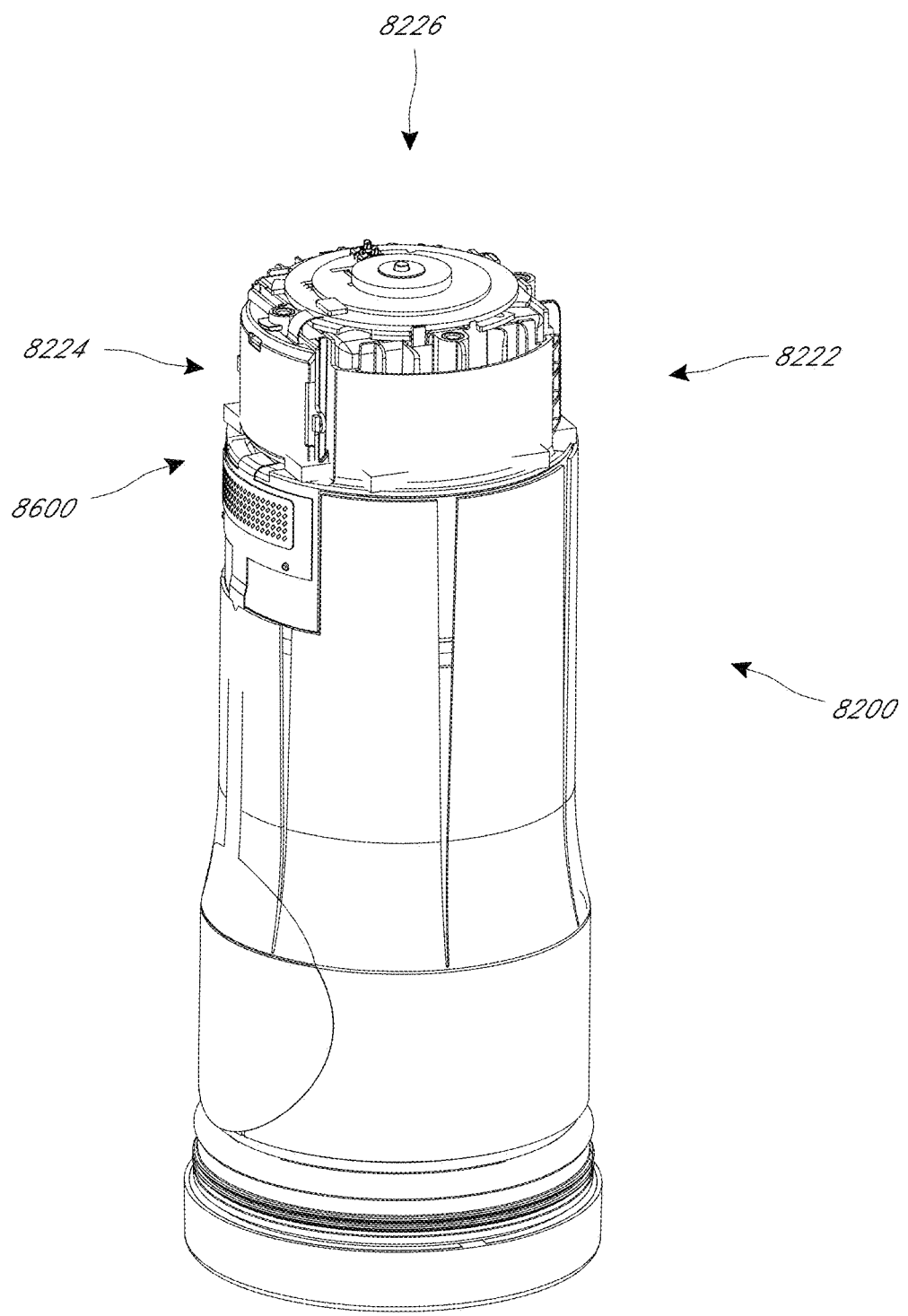
FIG. 15 shows a distal portion of one embodiment of an engine module for a drinkware container.
Figure 16:
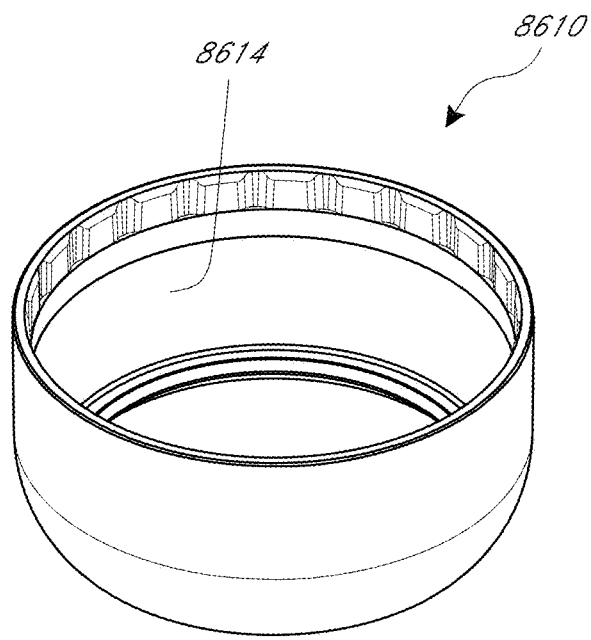
FIG. 16 shows a perspective top view of one embodiment of a temperature control user interface for one embodiment of a drinkware container.
Figure 17:
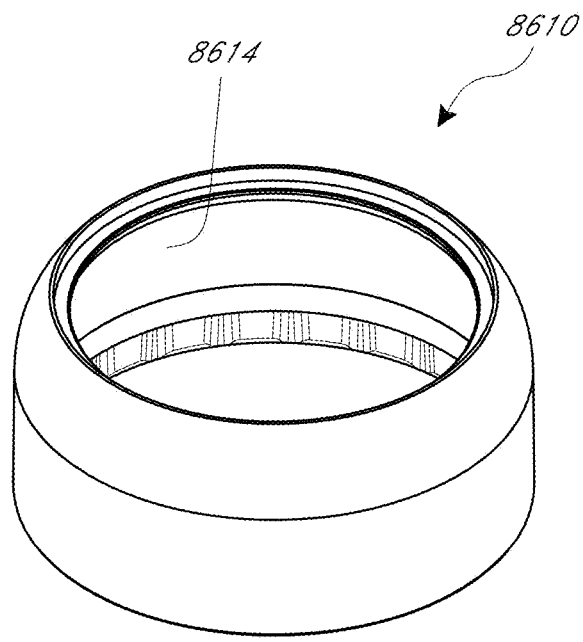
FIG. 17 shows a perspective bottom view of the temperature control user interface of FIG. 16.
Figure 18:
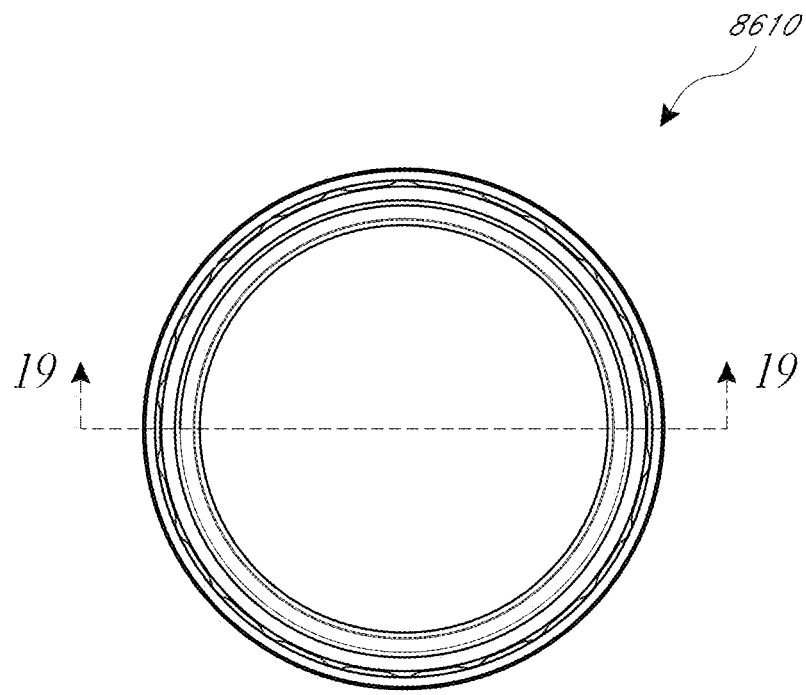
FIG. 18 shows a top planar view of the temperature control user interface of FIG. 16.
Figure 19:
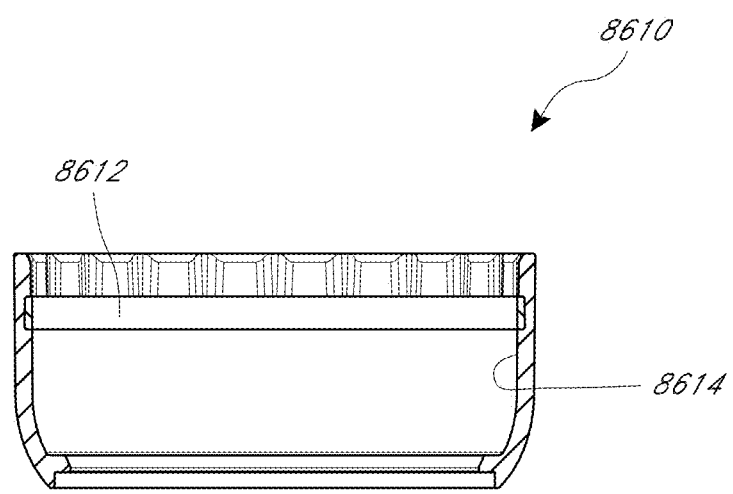
FIG. 19 shows a cross-sectional view of the temperature control user interface of FIG. 16.

FIG. 14 shows a schematic diagram for one embodiment of a temperature control circuit 8500 for the engine module 8200 of the drinkware container 8400. In the illustrated embodiment, the power supply PS, which can optionally one or more batteries, is electrically connected to the one or more heating or cooling elements HC vis a first MOSFET (metal-oxide semiconductor field effect transistor) 8510, and the one or more heating or cooling elements HC can be connected to ground GRN via a second MOSFET 8520. Advantageously, the temperature control circuit 8500 provides a temperature cut-off for the engine module 8200 that inhibits (e.g., prevents) the one or more heating or cooling elements HC to continue to heat or cool the contents of the drinkware container 8400 if one of the MOSFETs 8510, 8520 fails as both are required for power from the power supply PS to flow to the one or more heating or cooling elements HC. Advantageously, the use of the two MOSFETs 8510, 8520 in the temperature control circuit 8500 makes it unnecessary for the engine module 8200 of the drinkware container 8400 to utilize a thermal cut-off switch (TCO).

FIGS. 15-19 show one embodiment of a temperature control user interface 8600 that can optionally be incorporated in a drinkware container, such as the drinkware container 8400 described herein. The temperature control user interface 8600 can optionally include a dial or ring 8610 that is rotatably mounted (e.g., via one or more bearings) to a distal portion 8422 of the housing 8420. The dial or ring 8610 can optionally have one or more magnets 8612 disposed on an inner surface 8614 of the ring 8610 about at least a portion of a circumference of the ring 8610. For example, the ring 8610 can have a plurality of magnets 8612 disposed on the inner surface 8614 (e.g., evenly spaced) about the circumference of the ring 8610. Optionally, the plurality of magnets 8612 can be about 36 in total. However, in other embodiments, the plurality of magnets 8612 can be greater or lower in number than this. In one embodiment, the plurality of magnets 8612 can have alternating polarity (e.g., where the total number of magnets 8612 is 36, there can be 18 magnets with N polarity that alternate with 18 magnets with S polarity along the circumference of the ring 8610).

The inner surface 8614 of the ring 8610 can face a distal portion 8222 of the engine module 8200 of the drinkware container 8400. A circumferential wall 8424 of the distal portion 8422 of the housing 8420 can optionally be radially interposed between the inner surface 8614 of the ring 8610 and the distal portion 8222 of the engine module 8200. The distal portion 8222 of the engine module 8200 that is circumscribed by the ring 8610 can optionally include on or more magnetic sensors 8224. In one embodiment, the one or more magnetic sensors 8224 can be two Hall Effect Sensors. One suitable Hall Effect Sensor is the model DRV5013 Digital-Latch Hall Effect Sensor from Texas Instruments. The one or more magnetic sensors 8224 can optionally be two Hall Effect Sensors spaced ¼ wavelength apart, where the spacing between two magnets 8612 of the same polarity separated by a magnet 8612 of a different polarity spans about 1 wavelength. The spacing of the magnets 8612 and the one or more magnetic sensors 8224 can advantageously allow the temperature control user interface 8600 to detect approximately every 10 degrees of rotation of the ring 8610. In other embodiments, the temperature control user interface 8600 can have a different number of magnets 8612 and the spacing between the magnets 8612 can be such that the temperature control user interface 8600 can detect rotation of the ring 8610 to a resolution greater than 10 degrees (e.g., detect approximately every 5 degrees of rotation, detect approximately every 3 degrees of rotation, detect approximately every 1 degree of rotation, etc.). In other embodiments, the temperature control user interface 8600 can have a different number of magnets 8612 and the spacing between the magnets 8612 can be such that the temperature control user interface 8600 can detect rotation of the ring 8610 to a resolution lower than 10 degrees (e.g., detect approximately every 15 degrees of rotation, detect approximately every 20 degrees of rotation, detect approximately every 25 degrees of rotation, etc.).

The one or more magnetic sensors 8224 can be electrically connected with circuitry 8226 of the engine module 8200 that controls the operation of one or more heating or cooling elements HC of the engine module 8200 that effect heat transfer with the receptacle 8210 (e.g., cavity that can hold liquid) of the drinkware container 8400. As the ring 8610 is rotated by the user relative to the distal portion 8222 of the engine module 8200, the one or more magnetic sensors 8224 can detect the degree and direction of rotation of the ring 8610 and can communicate this information with the circuitry 8226, which can correlate the registered degree and direction of rotation of the ring 8610 with a change in the user selected temperature setpoint (e.g., via an algorithm stored in a memory of the circuitry 8226) and can operate the one or more heating or cooling elements HC at said new user selected temperature setpoint.

In another embodiment, the one or more magnets 8612 are disposed circumferentially about the distal portion 8222 of the engine module 8200 and the inner surface 8614 of the ring 8610 can include the one or more magnetic sensor 8224 thereon.

In another embodiment, the temperature control user interface 8600 can instead use one or more light sensors to detect the rotation of the ring 8610, and the detected rotation can be communicated to the circuitry 8226 of the engine module 8200 to correlate the direction and amount of rotation of the ring 8610 with a revised temperature setpoint, where the circuitry 8226 can control the operation of the one or more heating or cooling elements HC to effect heat transfer through a vessel wall of the drinkware container 8400 to achieve the revised temperature setpoint. In one embodiment, the one or more light sensors can be optical sensors that sense light emitted (e.g., by a laser, an LED, etc.). In one embodiment, the one or more light or optical sensors can be disposed on the inner surface 8614 of the ring 8610, and the light source (e.g., laser, LED) can be mounted on the distal portion 8222 of the engine module 8200.

In another embodiment, the temperature control user interface 8600 can instead use one or more capacitance sensors to detect the rotation of the ring 8610, and the detected rotation can be communicated to the circuitry 8226 of the engine module 8200 to correlate the direction and amount of rotation of the ring 8610 with a revised temperature setpoint, where the circuitry 8226 can control the operation of the one or more heating or cooling elements HC to effect heat transfer through a vessel wall of the drinkware container 8400 to achieve the revised temperature setpoint. In one embodiment, the one or more capacitance sensors can be disposed on the distal portion 8222 of the engine module 8200 and detect a change in capacitance of the inner surface 8614 of the ring 8610 as it is rotated. The ring 8610 can rotate 360 degrees in a clockwise and counter-clockwise direction, where rotating the ring 8610 in one direction (e.g., clockwise, counter-clockwise) increases the temperature setpoint and rotating the ring 8610 in an opposite direction (e.g., counter-clockwise, clockwise) decreases the temperature setpoint.

In another embodiment, the temperature control user interface 8600 can instead use a ferromagnetic material on the inner surface 8614 of the ring 8610 and a bias magnet and flux concentrator (e.g., as part of a giant magnetoresistance or GMR sensor system) to detect the direction and amount of rotation of the ring 8610, which can then be communicated to the circuitry 8226 of the engine module 8200 to correlate the direction and amount of rotation of the ring 8610 with a revised temperature setpoint, where the circuitry 8226 can control the operation of the one or more heating or cooling elements HC to effect heat transfer through a vessel wall of the drinkware container 8400 to achieve the revised temperature setpoint.

Figure 20:
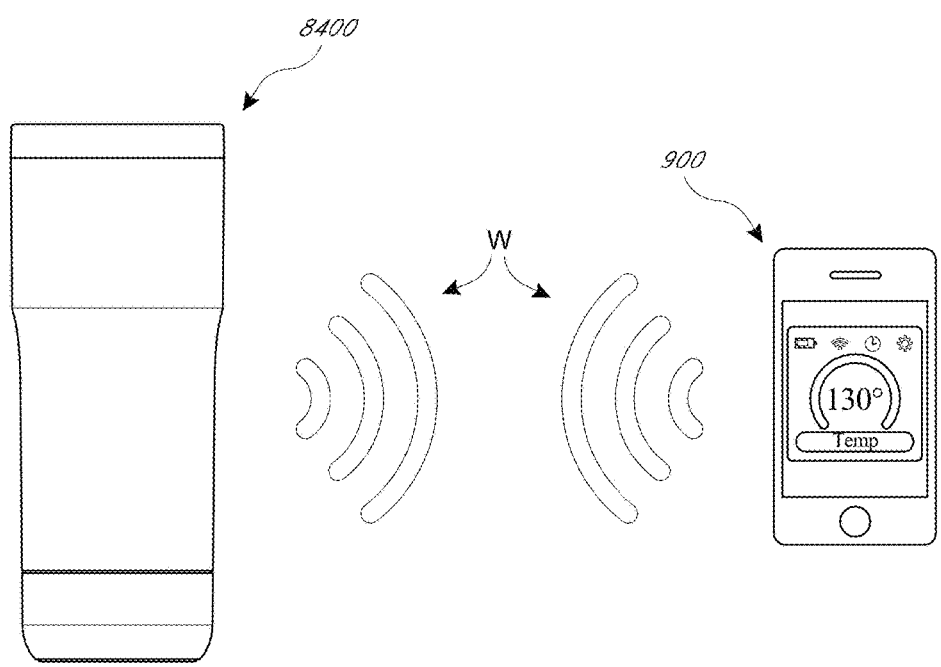
FIG. 20 is a schematic view showing communication between a drinkware container and a mobile electronic device (e.g., smartphone).

FIG. 20 shows the drinkware container 8400 (e.g., mug, travel mug, baby bottle, beer mug, liquid container) paired with the mobile electronic device 900. The mobile electronic device 900 can communicate wirelessly W with the container 8400 to transmit information thereto (e.g., to set the operating temperature of one or more heating and cooling elements HC of the container 8400) and/or to receive information therefrom (e.g., sensed liquid temperature, sensed liquid level, battery charge level). Information can optionally be communicated via the cloud. Optionally, the mobile electronic device 900 can communicate with the drinkware container 400, for example, via a short-range wireless connection (e.g., Bluetooth connection), where the mobile electronic device 900 (e.g., smartphone) can be paired with one or more drinkware containers 8400. The container 8400 can have a wireless receiver or transceiver, optionally have one or more energy storage devices, one or more heating or cooling elements, one or more temperature sensors, and control circuitry. Optionally, as discussed above, the container 8400 can have a user interface (e.g., ring or dial 5031, 8610) to set the temperature at which the heating element(s) are to heat the liquid in the container 8400 to. In another embodiment, the transceiver and the user interface can be excluded and the container 8400 can have a factory pre-set temperature or temperature range at which the one or more heating or cooling elements operate at.

In another embodiment, the container 8400 can also have a motion sensor (e.g., vibration sensor, accelerometer, gyro, etc.). While the heating or cooling elements are in operation, if the motion sensor detects no motion of the container 8400 for a predetermined amount of time (e.g., 15 minutes), which can be stored in a memory that communicates with the electronic module of the container 8400, the heating or cooling elements will be turned off (e.g., the electronic module will cease supplying power to the heating or cooling elements). In another embodiment, the automatic turn-off time period can be adjusted by a user (e.g., via a remote mobile device). In another embodiment, sensed movement or motion by the motion sensor can turn on the one or more heating or cooling elements.

Figure 21:
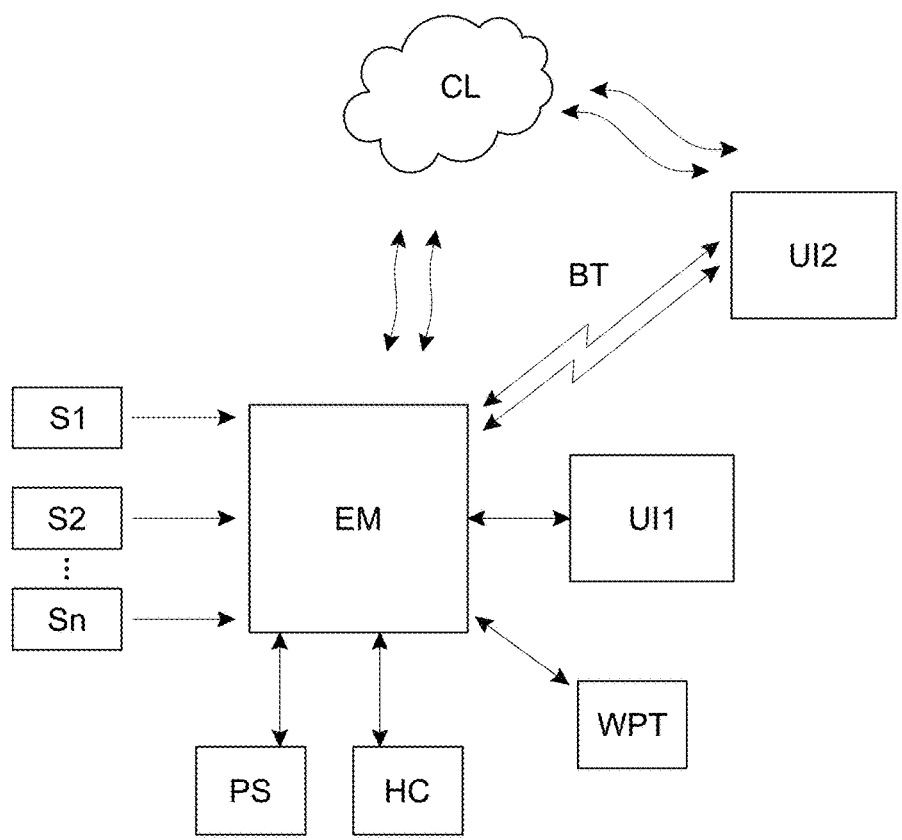
FIG. 21 is a schematic block diagram showing communication between an electronic module in actively heated/cooled drinkware, dishware, or serverware and a user interface thereon and/or on a remote electronic device.

With respect to any of the containers disclosed above, one or more sensors S1-Sn can be provided (see FIG. 21). In some embodiments, at least one sensor S2 of the one or more sensors S1-Sn can sense a liquid level (or information indicative of a liquid level) in a chamber (e.g., such as chamber 5015 in FIG. 1, etc.) of the container.

In one embodiment, the sensor S2 can be a load cell that can sense a weight of the container (e.g., container 5000, 8400). The electronic module EM of the container can receive the sensed weight information and compare it against a reference weight data (e.g., previously sensed when the container was empty and/or that is stored in a memory of the electronic module EM), and calculate a volume or level of the liquid in the container (e.g., using an algorithm to convert the sensed weight information to liquid volume or level measurement).

In another embodiment, the sensor S2 can be a pressure sensor on a bottom of the chamber (e.g., chamber 5015, etc.) of the container (e.g., container 5000, 8400) and can sense a hydrostatic pressure of the liquid in the chamber. The electronic module EM can calculate a liquid volume or level based at least in part on the sensed pressure information from the sensor S2.

In another embodiment, the sensor S2 can be a capacitance sensor (e.g., capacitance sensing strip) that extends along at least a portion of the length of an inner sidewall (e.g., inner sidewall 5010, etc.) that defines the chamber (e.g., chamber 5015, etc.) of the container (e.g., container 5000, 8400). The sensor S2 can sense a capacitance of a liquid in the container relative to a capacitance of air above the liquid level and communicate the sensed information to the electronic module EM, which can provide a measurement of liquid volume or liquid level in the container based on the sensed information. In another embodiment, the sensor S2 can sense a conductivity of the liquid or air proximate the sensor and the electronic module EM can provide a measurement of liquid level or volume based at least in part on the sensed information.

In another embodiment, the sensor S2 can be an ultrasonic sensor on an inner sidewall (e.g., inner sidewall 5010, etc.) that defines the chamber (e.g., chamber 5015, etc.) of the container (e.g., container 5000, 8400). The sensor S2 can use a pulse-echo or wall resonance (e.g. resonance of inner sidewall 5010, etc.) to sense information indicative of a liquid level in the container. For example, the sensor S2 can sense a time it takes for pulse emitted by the sensor S2 into the chamber of the container to return to the sensor (e.g., once it bounces from the liquid level location). The sensor S2 can transmit the sensed information to the electronic module EM, which can provide a measurement of liquid volume or liquid level in the container based on the sensed information.

In another embodiment, the sensor S2 can be an accelerometer or tilt sensor. The sensor S2 can sense an orientation (or change in orientation) of the container (e.g., container 5000, 8400) and communicate the sensed orientation information to the electronic module EM. The electronic module EM can estimate a liquid level in the container based on the sensed orientation information (e.g., using an algorithm that correlates a tilt angle to a liquid level). For example, if the sensor S2 senses an orientation of less than a first threshold (e.g., less than 30 degrees from an upright position) when a user has the container against their lips (e.g., sensed via a sensor on the container lip or lid, such as a contact sensor, temperature sensor, etc.) then the electronic module estimates the liquid level to be about full, and if the sensor S2 senses an orientation greater than a second threshold (e.g., greater than 90 degrees from an upright position) when a user has the container against their lips (e.g., sensed via a sensor on the container lip or lid, such as a contact sensor, temperature sensor, etc.) then the electronic module estimates the liquid level to be about empty, and the electronic module EM can use an algorithm to interpolate between the two thresholds to infer intermediate liquid levels of the container (e.g., half full, quarter full, etc.).

In another embodiment, the sensor S2 can be a light sensor that measures light attenuation through the liquid and provides the sensed information to the electronic module EM, which can provide a measurement of liquid volume or liquid level in the container based on the sensed information (e.g., using an algorithm to correlate light attenuation with liquid volume or level).

In another embodiment, the sensor S2 can be a float that floats on the liquid level in the chamber (e.g., chamber 5015, etc.) of the container (e.g., container 5000, 8400) and communicates the sensed position information to the electronic module EM, which can provide a measurement of liquid volume or liquid level in the container based on the sensed information.

In another embodiment, liquid level in the container (e.g., container 5000, 8400) is measured based on sensed temperature (or information indicative of temperature) from one or more (e.g., a plurality of) temperature sensors S3 (e.g., as discussed above in connection with the operation of the container 5000, 8400). In one embodiment, the one or more sensors S3 can sense how long it takes the temperature to increase a reference number of degrees (e.g., 1 degree F. or 1 degree C.) when the chamber of the container is full of liquid to provide a first reference time, and the first reference time can be stored in a memory (e.g., a memory of the electronic module EM). Optionally, additional reference times can be provided by the one or more sensors S3 when the chamber of the container has other volumes of liquid therein (e.g., half full, ¾ full) and the reference times stored in said memory. During operation of the container, the one or more temperature sensors S3 can measure how long it takes for the temperature in the chamber to change by said reference number of degrees and communicate the sensed time information to the electronic module EM, which can provide a measurement of liquid volume or liquid level in the container based on the sensed time information, for example, based on an algorithm correlating time versus liquid volume or level. In one embodiment, the sensed time information is compared against one or more of the reference times and the liquid level or volume interpolated between the level or volume values corresponding to the reference times.

Optionally, the algorithm can calculate the liquid volume or level based at least in part on sensed ambient temperature (e.g., from a sensor S4), to account for variations in how long it takes the temperature to increases by the reference number of degrees depending on ambient temperature (e.g., at high altitude, low altitude, in winter, in summer, etc.). Use of the one or more temperature sensor S3 therefore advantageously allows measurement of temperature and liquid level in the container with one sensor instead of requiring a separate sensor to measure liquid level, which provides for a simpler and less costly system.

FIG. 21 above shows a block diagram of a communication system for any of the drinkware containers described herein. In the illustrated embodiment, the electronic module EM (such as the electronic module disclosed herein for the drinkware containers) can receive sensed information from one or more sensors S1-Sn (e.g., liquid level sensors, liquid volume sensors, temperature sensors, battery charge sensors, capacitance sensors, tilt sensors or gyroscopes). The electronic module EM can also receive information from and transmit information (e.g., instructions) to one or more heating elements HC (e.g., to operate each of the heating elements in a heating mode, turn off, turn on, vary power output of, etc.) and optionally to one or more power storage devices PS (e.g., batteries, such as to charge the batteries or manage the power provided by the batteries to the one or more heating or cooling elements). The electronic module EM can also communicate with a wireless power transmitter WPT (e.g., an inductive power transmitter) on the drinkware container. The electronic module EM can also communicate with (e.g., transmit information to and receive information, such as user instructions from, a user interface UI1 on the unit (e.g., on the body of the drinkware container). The electronic module EM can also communicate with an electronic device ED (e.g., a mobile electronic device such as a mobile phone, PDA, tablet computer, laptop computer, electronic watch; or a desktop computer) via the cloud CL or via a wireless communication system such as Bluetooth BT. The electronic device ED can have a user interface UI2, that can display information associated with the operation of the drinkware container (as disclosed herein), and that can receive information (e.g., instructions) from a user and communicate said information to the drinkware container (as disclosed herein).

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the drinkware container, as disclosed herein. That is, the electronic module or electronics can have different form factors.

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are in describe for drinkware containers, the features are applicable to containers that are not drinkware containers (e.g., plates, bowls, serverware, food storage containers) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Though the features and ideas disclosed above may be related to actively heating or cooling food or beverage, the embodiments above may also be used to heat or cool air spaces, such as refrigeration devices, cold boxes, coolers, portable coolers, or portable refrigerators, or hot boxes, or warmer drawers, or heat chambers, or any other device that would benefit from the heating or cooling of the air within a defined cavity or chamber.

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the plate, serving dish, hot/cool plate, mug, travel mug, cup, liquid container or baby bottle, as disclosed herein. That is, the electronic module or electronics can have different form factors.

Of course, the foregoing description is that of certain features, aspects and advantages of the present invention, to which various changes and modifications can be made without departing from the spirit and scope of the present invention. Moreover, the heated or cooled dishware and drinkware need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. Accordingly, it should be understood that various features and aspects of the disclosed embodiments can be combined with or substituted for one another in order to form varying modes of the discussed heated or cooled containers (e.g., drinkware, dishware, and/or serverware).

What is claimed is:

1. An actively heated or cooled beverage container, comprising:
   a body chosen from a group consisting of a mug, a cup and a travel mug, the body having a chamber configured to receive and hold a food or beverage therein; and
   a temperature control system, comprising
      a phase change material positioned about at least a portion of the chamber, the phase change material configured to transition from one phase to a second phase at a predetermined temperature, the phase change material configured to remove heat from the beverage disposed in the chamber that has a temperature above a predetermined drinking temperature to lower the temperature of the beverage toward the predetermined drinking temperature,
      one or more heating elements positioned in thermal communication with a different portion of the chamber than the phase change material,
      control circuitry configured to control the operation of the heating element, and
      a ring rotatably coupled to a distal end of the body, the ring configured to rotate about a central axis of the container relative to a proximal portion of the body and to communicate with the control circuitry, where rotation of the ring adjusts a temperature setpoint of the temperature control system,
   wherein the distal end of the body comprises one or more Hall Effect sensors configured to sense information indicative of one or both of a direction and an amount of rotation of the ring and to communicate one or more signals to the control circuitry of the sensed information, the control circuitry configured to control the one or more heating elements based at least in part on the one or more signals, and wherein the control circuitry is configured to control the one or more heating elements to add heat to the beverage in the chamber to maintain the temperature of the beverage at approximately the predetermined drinking temperature or to increase the temperature of the beverage above said predetermined drinking temperature based upon the rotation of the ring.

2. The container of claim 1, wherein the ring comprises a plurality of magnets on an inner surface of the ring, the one or more Hall Effect Sensors configured to sense the location of the plurality of magnets to generate the one or more signals of the sensed information indicative of one or both of the direction and amount of rotation of the ring.

3. The container of claim 1, further comprising one or more power storage elements configured to provide electrical energy to one or both of the heating element and control circuitry.

4. The container of claim 1, wherein the heating element is disposed below a base of the chamber.

5. The container of claim 1, wherein the heating element is disposed circumferentially about at least a portion of the chamber at a location below the phase change material.

6. The container of claim 1, wherein the heating element extends around an entire circumference of the chamber.

7. The container of claim 1, further comprising one or more electrical contacts on an outer surface of the body configured to contact one or more electrical contacts on a charging base.

8. The container of claim 1, wherein the control circuitry is configured to communicate wirelessly with a remote mobile electronic device.

9. The container of claim 1, wherein the ring and the body are co-axial.

10. The container of claim 1, further comprising a lid removably coupleable to the top end of the body, the lid having a circumferential lip and a base disposed below the lip that is selectively movable relative to the circumferential lip, wherein in a closed position a circumferential edge of the base contacts a bottom of the circumferential lip to inhibit fluid flow through the lid, and wherein in an open position the circumferential edge of the base is spaced apart from the bottom of the circumferential lip to define a circumferential gap therebetween that allows fluid flow through the lid irrespective of the angular orientation of the vessel.

11. The container of claim 10, wherein the base of the lid is spring loaded relative to a distal housing of the lid.

12. The container of claim 10, wherein the base of the lid has a circular shape with and the circumferential edge of the base of the lid has a diameter that is smaller than an outer diameter of the circumferential lip.

13. The container of claim 10, wherein the base of the lid and the circumferential lip are co-axial.

14. The container of claim 1, further comprising a visual display comprising one or more light emitting diodes configured to display one or more images and a gasket with one or more openings configured to at least partially receive the one or more light emitting diodes therethrough, the gasket configured to inhibit light from the one or more light emitting diodes being directed sideways from the one or more light emitting diodes to inhibit blurring of the one or more images on the visual display.

15. The container of claim 14, wherein the one or more light emitting diodes are a plurality of light emitting diodes and the gasket has a plurality of openings configured to at least partially receive the plurality of light emitting diodes.

* * * * *